United States Patent
Haber et al.

(10) Patent No.: US 12,346,290 B2
(45) Date of Patent: Jul. 1, 2025

(54) WORKLOAD ALLOCATION FOR FILE SYSTEM MAINTENANCE

(71) Applicant: Qumulo, Inc., Seattle, WA (US)

(72) Inventors: Steven Henry Haber, Seattle, WA (US); Noah Trent Nelson, Seattle, WA (US); Thomas Scott Urban, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/864,190

(22) Filed: Jul. 13, 2022

(65) Prior Publication Data

US 2024/0020268 A1    Jan. 18, 2024

(51) Int. Cl.
*G06F 16/11*   (2019.01)
*G06F 11/14*   (2006.01)
*G06F 16/16*   (2019.01)

(52) U.S. Cl.
CPC ........ *G06F 16/128* (2019.01); *G06F 11/1451* (2013.01); *G06F 16/162* (2019.01); *G06F 2201/84* (2013.01)

(58) Field of Classification Search
CPC .. G06F 16/128; G06F 16/162; G06F 11/1451; G06F 2201/84
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 17/190,653 mailed Aug. 2, 2022, pp. 1-8.

(Continued)

*Primary Examiner* — Tony Wu
(74) *Attorney, Agent, or Firm* — John W. Branch; Branch Partners PLLC

(57) ABSTRACT

Embodiments are directed to workload allocation for file system maintenance. A file system that includes storage nodes and snapshots may be provided such that each snapshot may be associated with a plurality of data blocks. If snapshots are deleted further actions may be performed, including: determining the dead blocks associated with the deleted snapshots such that each dead block may be a data block that may be unassociated with undeleted snapshots; adding the plurality of dead blocks to dead trees located on the storage nodes; determining an urgency score based on a workload model and file system metrics; determining delete tasks based on the urgency score; determining a portion of the storage nodes based on a number of delete tasks; and executing the delete tasks on the portion storage nodes to delete the dead blocks to return storage capacity to the file system.

28 Claims, 13 Drawing Sheets

(56) References Cited

U.S. PATENT DOCUMENTS

| | | |
|---|---|---|
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 * | 7/2010 | Cram ............... G06F 11/1469 707/754 |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,396,202 B1 | 7/2016 | Drobychev et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,613,120 B1 | 4/2017 | Kharatishvili et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 * | 8/2019 | Kalush ............ G06Q 10/06311 |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |

(56) References Cited

U.S. PATENT DOCUMENTS

| | | |
|---|---|---|
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 | 3/2024 | Kirby et al. |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1* | 5/2007 | Ahrens ............... G06F 16/128 |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0145471 A1* | 6/2013 | Richard ............... G06F 21/562 |
| | | 726/24 |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0258657 A1* | 9/2014 | Schott ............... G06F 3/0644 |
| | | 711/162 |
| 2014/0280485 A1 | 9/2014 | A Hummaida et al. |
| 2014/0281307 A1 | 9/2014 | Peterson et al. |

(56) References Cited

U.S. PATENT DOCUMENTS

| | | |
|---|---|---|
| 2014/0281411 A1 | 9/2014 | Abdallah |
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0350363 A1 | 12/2016 | Raja et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2016/0380913 A1 | 12/2016 | Morgan et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1* | 7/2020 | Davis .................... G06F 16/178 |
| 2020/0242082 A1 | 7/2020 | Chmiel et al. |
| 2020/0286270 A1 | 9/2020 | Lymperopoulos et al. |
| 2020/0341689 A1* | 10/2020 | Smith .................... G06F 3/0614 |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0173588 A1 | 6/2021 | Kannan et al. |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1* | 3/2022 | Wang .................... G06F 3/0608 |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |

(56) References Cited

U.S. PATENT DOCUMENTS

| | | |
|---|---|---|
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0106208 A1 | 4/2023 | Nossenson et al. |
| 2023/0342053 A1 | 10/2023 | Varghese et al. |
| 2024/0028596 A1 | 1/2024 | Lakshman et al. |

FOREIGN PATENT DOCUMENTS

| | | |
|---|---|---|
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 1999044145 A1 | 9/1999 |
| WO | 0072201 A1 | 11/2000 |
| WO | 2009007250 A2 | 1/2009 |
| WO | 2012029259 A1 | 3/2012 |
| WO | 2016/205752 A1 | 12/2016 |
| WO | 2021/151107 A1 | 7/2021 |
| WO | 2021/189055 A2 | 9/2021 |

OTHER PUBLICATIONS

Office Communication for U.S. Appl. No. 17/115,529 mailed Aug. 8, 2022, pp. 1-21.
Office Communication for U.S. Appl. No. 17/588,895 mailed Aug. 12, 2022, pp. 1-12.
Office Communication for U.S. Appl. No. 17/491,017 mailed Aug. 17, 2022, pp. 1-5.
Office Communication for U.S. Appl. No. 17/203,452 mailed Sep. 8, 2022, pp. 1-4.
Office Communication for U.S. Appl. No. 17/491,017 mailed Sep. 15, 2022, pp. 1-55.
Office Communication for U.S. Appl. No. 16/226,587 mailed Aug. 5, 2019, pp. 1-46.
Office Communication for U.S. Appl. No. 16/228,716 mailed Jun. 24, 2019, pp. 1-10.
Office Communication for U.S. Appl. No. 16/231,354 mailed Jul. 10, 2019, pp. 1-8.
Office Communication for U.S. Appl. No. 16/262,756 mailed Aug. 5, 2019, pp. 1-35.
Office Communication for U.S. Appl. No. 15/967,499 mailed Jun. 27, 2018, pp. 1-16.
Office Communication for U.S. Appl. No. 16/226,587 mailed Feb. 25, 2019, pp. 1-43.
Office Communication for U.S. Appl. No. 16/228,716 mailed Feb. 28, 2019, pp. 1-15.
Office Communication for U.S. Appl. No. 16/231,354 mailed Mar. 25, 2019, pp. 1-10.
Office Communication for U.S. Appl. No. 16/262,756 mailed Apr. 2, 2019, pp. 1-29.
Office Communication for U.S. Appl. No. 16/262,790 mailed Aug. 23, 2019, pp. 1-16.
Office Communication for U.S. Appl. No. 16/262,790 mailed Apr. 18, 2019, pp. 1-14.
Office Communication for U.S. Appl. No. 16/262,756 mailed Oct. 25, 2019, pp. 1-4.
Office Communication for U.S. Appl. No. 16/659,488 mailed Dec. 30, 2019, pp. 1-6.
Office Communication for U.S. Appl. No. 14/595,598 mailed Dec. 31, 2019, pp. 1-16.
Office Communication for U.S. Appl. No. 16/004,208 mailed Aug. 27, 2018, pp. 1-11.
Office Communication for U.S. Appl. No. 16/234,395 mailed Aug. 8, 2019, pp. 1-10.
Office Communication for U.S. Appl. No. 16/234,334 mailed Apr. 5, 2019, pp. 1-15.
Office Communication for U.S. Appl. No. 16/234,395 mailed Mar. 28, 2019, pp. 1-10.

Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 mailed Oct. 11, 2019, pp. 1-16.
Office Communication for U.S. Appl. No. 15/473,051 mailed Jun. 30, 2017, pp. 1-23.
Extended European Search Report for European Patent Application No. 18155779.4 mailed Apr. 17, 2018, pp. 1-15.
Office Communication for U.S. Appl. No. 16/004,182 mailed Aug. 23, 2018, pp. 1-43.
Office Communication for U.S. Appl. No. 16/004,182 mailed Mar. 5, 2019, pp. 1-46.
Office Communication for U.S. Appl. No. 16/004,182 mailed Jul. 3, 2019, pp. 1-45.
Office Communication for U.S. Appl. No. 15/694,604 mailed Jun. 3, 2019, pp. 1-8.
Office Communication for U.S. Appl. No. 16/004,182 mailed May 22, 2019, pp. 1-4.
Office Communication for U.S. Appl. No. 14/595,043 mailed May 4, 2017, pp. 1-30.
Office Communication for U.S. Appl. No. 14/595,043 mailed Feb. 23, 2018, pp. 1-16.
Office Communication for U.S. Appl. No. 14/595,043 mailed May 25, 2018, pp. 1-7.
Office Communication for U.S. Appl. No. 14/595,043 mailed Oct. 5, 2018, pp. 1-17.
Office Communication for U.S. Appl. No. 14/595,043 mailed Jun. 7, 2019, pp. 1-19.
Office Communication for U.S. Appl. No. 14/595,043 mailed Aug. 27, 2019, pp. 1-17.
Office Communication for U.S. Appl. No. 14/658,015 mailed Apr. 27, 2017, pp. 1-7.
Office Communication for U.S. Appl. No. 14/658,015 mailed Jan. 4, 2018, pp. 1-28.
Office Communication for U.S. Appl. No. 14/658,015 mailed Jul. 13, 2018, pp. 1-8.
Office Communication for U.S. Appl. No. 14/859,061 mailed Sep. 22, 2017, pp. 1-16.
Office Communication for U.S. Appl. No. 15/831,236 mailed Mar. 30, 2018, pp. 1-8.
Office Communication for U.S. Appl. No. 15/831,236 mailed Aug. 15, 2018, pp. 1-14.
Office Communication for U.S. Appl. No. 14/859,114 mailed Jul. 24, 2017, pp. 1-41.
Office Communication for U.S. Appl. No. 14/859,114 mailed Feb. 21, 2018, pp. 1-25.
Office Communication for U.S. Appl. No. 14/859,114 mailed May 11, 2018, pp. 1-5.
Office Communication for U.S. Appl. No. 14/859,114 mailed Jun. 27, 2018, pp. 1-33.
Office Communication for U.S. Appl. No. 14/859,114 mailed Nov. 19, 2018, pp. 1-35.
Office Communication for U.S. Appl. No. 14/859,114 mailed Jan. 31, 2019, pp. 1-4.
Office Communication for U.S. Appl. No. 14/859,114 mailed Mar. 7, 2019, pp. 1-32.
Office Communication for U.S. Appl. No. 14/859,114 mailed Jun. 26, 2019, pp. 1-21.
Office Communication for U.S. Appl. No. 14/859,114 mailed Sep. 13, 2019, pp. 1-6.
Office Communication for U.S. Appl. No. 14/859,114 mailed Nov. 26, 2019, pp. 1-21.
Office Communication for U.S. Appl. No. 15/288,853 mailed Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 mailed Mar. 25, 2019, pp. 1-10.

(56) References Cited

OTHER PUBLICATIONS

Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 mailed Jul. 11, 2019, pp. 1-9.
Office Communication for U.S. Appl. No. 15/474,047 mailed Sep. 18, 2017, pp. 1-14.
Office Communication for U.S. Appl. No. 15/474,047 mailed Mar. 9, 2018, pp. 1-8.
Office Communication for U.S. Appl. No. 15/474,047 mailed Jun. 11, 2018, pp. 1-6.
Office Communication for U.S. Appl. No. 15/474,047 mailed Aug. 15, 2018, pp. 1-11.
Office Communication for U.S. Appl. No. 15/957,809 mailed Jun. 28, 2018, pp. 1-27.
Office Communication for U.S. Appl. No. 15/957,809 mailed Jan. 24, 2019, pp. 1-11.
Office Communication for U.S. Appl. No. 16/434,157 mailed Jul. 25, 2019, pp. 1-8.
Office Communication for U.S. Appl. No. 15/854,447 mailed May 6, 2019, pp. 1-9.
Office Communication for U.S. Appl. No. 16/505,562 mailed Aug. 30, 2019, pp. 1-11.
Extended European Search Report for European Patent Application No. 17206518.7 mailed Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 mailed Jan. 7, 2020, pp. 1-46.
Office Communication for U.S. Appl. No. 16/125,573 mailed Nov. 21, 2019, pp. 1-13.
Office Communication for U.S. Appl. No. 16/226,587 mailed Oct. 24, 2019, pp. 1-4.
Office Communication for U.S. Appl. No. 16/262,790 mailed Dec. 12, 2019, pp. 1-10.
Office Communication for U.S. Appl. No. 16/234,334 mailed Jan. 16, 2020, pp. 1-8.
Office Communication for U.S. Appl. No. 15/694,604 mailed Nov. 20, 2019, pp. 1-8.
Office Communication for U.S. Appl. No. 16/262,756 mailed Jan. 28, 2020, pp. 1-21.
Office Communication for U.S. Appl. No. 16/434,157 mailed Jan. 29, 2020, pp. 1-9.
Office Communication for U.S. Appl. No. 16/262,790 mailed Feb. 6, 2020, pp. 1-8.
Office Communication for U.S. Appl. No. 14/859,114 mailed Mar. 13, 2020, pp. 1-21.
Office Communication for U.S. Appl. No. 16/752,451 mailed Mar. 12, 2020, pp. 1-14.
Office Communication for U.S. Appl. No. 16/775,041 mailed Mar. 11, 2020, pp. 1-8.
Office Communication for U.S. Appl. No. 16/779,362 mailed Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft_(computer_science) (Year: 2019), pp. 1-4.
Office Communication for U.S. Appl. No. 16/004,182 mailed Mar. 23, 2020, pp. 1-4.
Office Communication for U.S. Appl. No. 16/752,509 mailed Apr. 2, 2020, pp. 1-8.
Office Communication for U.S. Appl. No. 16/152,277 mailed Apr. 3, 2020, pp. 1-10.
Office Communication for U.S. Appl. No. 16/004,182 mailed Apr. 28, 2020, pp. 1-51.
Office Communication for U.S. Appl. No. 16/152,259 mailed Apr. 29, 2020, pp. 1-19.
Office Communication for U.S. Appl. No. 14/859,114 mailed Jun. 5, 2020, pp. 1-5.
Office Communication for U.S. Appl. No. 16/262,756 mailed Jun. 8, 2020, pp. 1-22.
Office Communication for U.S. Appl. No. 14/595,598 mailed Jul. 9, 2020, pp. 1-19.
Office Communication for U.S. Appl. No. 16/752,451 mailed Jul. 23, 2020, pp. 1-8.
Office Communication for U.S. Appl. No. 14/859,114 mailed Jul. 23, 2020, pp. 1-21.
Office Communication for U.S. Appl. No. 16/152,615 mailed Aug. 6, 2020, pp. 1-7.
Office Communication for U.S. Appl. No. 16/779,362 mailed Aug. 7, 2020, pp. 1-11.
Office Communication for U.S. Appl. No. 16/883,922 mailed Aug. 7, 2020, pp. 1-13.
Office Communication for U.S. Appl. No. 16/775,041 mailed Aug. 18, 2020, pp. 1-9.
Office Communication for U.S. Appl. No. 16/883,879 mailed Sep. 1, 2020, pp. 1-11.
Extended European Search Report for European Patent Application No. 16812585.4 mailed Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Examination Report for European Patent Application No. 16812585.4 mailed Jan. 2, 2020, pp. 1-6.
International Search Report and Written Opinion for International Patent Application No. PCT/US2016/038242 mailed Oct. 11, 2016, pp. 1-11.
Office Communication for U.S. Appl. No. 14/595,598 mailed Jul. 31, 2019, pp. 1-5.
Office Communication for U.S. Appl. No. 14/595,598 mailed Sep. 20, 2018, pp. 1-18.
Office Communication for U.S. Appl. No. 14/595,598 mailed Dec. 15, 2017, pp. 1-18.
Office Communication for U.S. Appl. No. 14/595,598 mailed Feb. 24, 2017, pp. 1-8.
Office Communication for U.S. Appl. No. 14/595,598 mailed Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, pp. 1-7.
Examination Report for European Patent Application No. 18155779.4 mailed Oct. 8, 2019, pp. 1-4.
Office Communication for U.S. Appl. No. 16/152,259 mailed Aug. 28, 2020, pp. 1-5.
Office Communication for U.S. Appl. No. 16/752,509 mailed Aug. 11, 2020, pp. 1-7.
Office Communication for U.S. Appl. No. 14/595,598 mailed Sep. 25, 2020, pp. 1-7.
Office Communication for U.S. Appl. No. 16/152,277 mailed Oct. 16, 2020, pp. 1-10.
Office Communication for U.S. Appl. No. 16/152,615 mailed Oct. 20, 2020, pp. 1-7.
Office Communication for U.S. Appl. No. 16/775,041 mailed Nov. 3, 2020, pp. 1-5.
Office Communication for U.S. Appl. No. 17/062,500 mailed Nov. 12, 2020, pp. 1-12.
Office Communication for U.S. Appl. No. 16/004,182 mailed Nov. 30, 2020, pp. 1-55.
Office Communication for U.S. Appl. No. 14/859,114 mailed Dec. 1, 2020, pp. 1-24.
Office Communication for U.S. Appl. No. 16/883,922 mailed Dec. 2, 2020, pp. 1-9.

(56) References Cited

OTHER PUBLICATIONS

Office Communication for U.S. Appl. No. 16/883,879 mailed Dec. 8, 2020, pp. 1-5.
Office Communication for U.S. Appl. No. 16/152,277 mailed Dec. 28, 2020, pp. 1-5.
Office Communication for U.S. Appl. No. 16/004,182 mailed Jan. 28, 2021, pp. 1-4.
Office Communication for U.S. Appl. No. 14/595,598 mailed Feb. 4, 2021, pp. 1-19.
Office Communication for U.S. Appl. No. 17/115,529 mailed Feb. 8, 2021, pp. 1-15.
Office Communication for U.S. Appl. No. 16/262,756 mailed Feb. 10, 2021, pp. 1-19.
Office Communication for U.S. Appl. No. 17/114,384 mailed Feb. 17, 2021, pp. 1-12.
Examination Report for European Patent Application No. 17206518.7 mailed Feb. 23, 2021, pp. 1-6.
Office Communication for U.S. Appl. No. 14/859,114 mailed Mar. 8, 2021, pp. 1-4.
Office Communication for U.S. Appl. No. 16/004,182 mailed Mar. 8, 2021, pp. 1-60.
Office Communication for U.S. Appl. No. 17/062,500 mailed Mar. 9, 2021, pp. 1-17.
Office Communication for U.S. Appl. No. 16/152,277 mailed Mar. 18, 2021, pp. 1-10.
Office Communication for U.S. Appl. No. 17/160,698 mailed Mar. 18, 2021, pp. 1-11.
Office Communication for U.S. Appl. No. 17/062,500 mailed May 18, 2021, pp. 1-4.
Office Communication for U.S. Appl. No. 17/203,371 mailed May 20, 2021, pp. 1-10.
Office Communication for U.S. Appl. No. 17/115,529 mailed May 25, 2021, pp. 1-18.
Office Communication for U.S. Appl. No. 14/859,114 mailed May 26, 2021, pp. 1-11.
Office Communication for U.S. Appl. No. 16/262,756 mailed May 27, 2021, pp. 1-7.
Office Communication for U.S. Appl. No. 17/114,384 mailed May 27, 2021, pp. 1-13.
Office Communication for U.S. Appl. No. 17/190,653 mailed May 27, 2021, pp. 1-11.
Office Communication for U.S. Appl. No. 16/741,567 mailed Jun. 8, 2021, pp. 1-5.
Office Communication for U.S. Appl. No. 17/203,452 mailed Jun. 23, 2021, pp. 1-11.
Office Communication for U.S. Appl. No. 16/152,277 mailed Jun. 25, 2021, pp. 1-10.
Office Communication for U.S. Appl. No. 16/004,182 mailed Jul. 1, 2021, pp. 1-58.
Office Communication for U.S. Appl. No. 17/160,698 mailed Jul. 2, 2021, pp. 1-12.
International Search Report and Written Opinion for International Patent Application No. PCT/US2021/023531 mailed Jul. 6, 2021, pp. 1-7.
Office Communication for U.S. Appl. No. 17/062,500 mailed Jul. 12, 2021, pp. 1-18.
Office Communication for U.S. Appl. No. 16/775,041 mailed Jul. 21, 2021, pp. 1-11.
Office Communication for U.S. Appl. No. 17/114,384 mailed Aug. 3, 2021, pp. 1-4.
Office Communication for U.S. Appl. No. 14/595,598 mailed Aug. 6, 2021, pp. 1-20.
Office Communication for U.S. Appl. No. 17/115,529 mailed Aug. 12, 2021, pp. 1-4.
Office Communication for U.S. Appl. No. 17/190,653 mailed Aug. 27, 2021, pp. 1-11.
Office Communication for U.S. Appl. No. 17/114,384 mailed Sep. 2, 2021, pp. 1-5.
Office Communication for U.S. Appl. No. 16/152,277 mailed Sep. 3, 2021, pp. 1-4.
Office Communication for U.S. Appl. No. 16/004,182 mailed Sep. 10, 2021, pp. 1-4.
Office Communication for U.S. Appl. No. 16/004,182 mailed Sep. 29, 2021, pp. 1-11.
Office Communication for U.S. Appl. No. 16/152,277 mailed Oct. 18, 2021, pp. 1-5.
International Search Report and Written Opinion for International Patent Application No. PCT/US2021/023525 mailed Oct. 12, 2021, pp. 1-7.
Office Communication for U.S. Appl. No. 17/115,529 mailed Oct. 22, 2021, pp. 1-20.
Office Communication for U.S. Appl. No. 17/062,500 mailed Oct. 27, 2021, pp. 1-17.
Office Communication for U.S. Appl. No. 14/595,598 mailed Oct. 28, 2021, pp. 1-6.
Office Communication for U.S. Appl. No. 16/741,567 mailed Oct. 28, 2021, pp. 1-11.
Office Communication for U.S. Appl. No. 17/203,452 mailed Nov. 2, 2021, pp. 1-13.
Office Communication for U.S. Appl. No. 17/190,653 mailed Nov. 10, 2021, pp. 1-6.
Office Communication for U.S. Appl. No. 17/484,167 mailed Nov. 18, 2021, pp. 1-15.
Office Communication for U.S. Appl. No. 17/504,289 mailed Dec. 7, 2021, pp. 1-15.
Office Communication for U.S. Appl. No. 17/114,384 mailed Dec. 14, 2021, pp. 1-7.
Office Communication for U.S. Appl. No. 17/190,653 mailed Dec. 21, 2021, pp. 1-12.
Office Communication for U.S. Appl. No. 17/508,869 mailed Dec. 22, 2021, pp. 1-9.
Office Communication for U.S. Appl. No. 17/491,017 mailed Dec. 23, 2021, pp. 1-41.
Office Communication for U.S. Appl. No. 14/595,598 mailed Dec. 29, 2021, pp. 1-19.
Office Communication for U.S. Appl. No. 17/062,500 mailed Jan. 7, 2022, pp. 1-4.
Office Communication for U.S. Appl. No. 16/741,567 mailed Jan. 11, 2022, pp. 1-6.
Office Communication for U.S. Appl. No. 17/203,452 mailed Jan. 14, 2022, pp. 1-4.
Office Communication for U.S. Appl. No. 17/510,043 mailed Jan. 21, 2022, pp. 1-13.
Office Communication for U.S. Appl. No. 16/741,567 mailed Feb. 7, 2022, pp. 1-8.
Office Communication for U.S. Appl. No. 17/530,420 mailed Feb. 10, 2022, pp. 1-24.
Office Communication for U.S. Appl. No. 16/004,182 mailed Feb. 18, 2022, pp. 1-11.
Office Communication for U.S. Appl. No. 17/115,529 mailed Feb. 18, 2022, pp. 1-20.
Office Communication for U.S. Appl. No. 17/203,452 mailed Feb. 24, 2022, pp. 1-14.
Office Communication for U.S. Appl. No. 17/484,167 mailed Mar. 11, 2022, pp. 1-11.
Office Communication for U.S. Appl. No. 17/062,500 mailed Mar. 22, 2022, pp. 1-19.
Office Communication for U.S. Appl. No. 17/504,289 mailed Mar. 28, 2022, pp. 1-9.
Office Communication for U.S. Appl. No. 17/588,120 mailed Apr. 11, 2022, pp. 1-36.
Office Communication for U.S. Appl. No. 17/588,895 mailed Apr. 27, 2022, pp. 1-6.
Office Communication for U.S. Appl. No. 17/190,653 mailed Apr. 28, 2022, pp. 1-13.
Office Communication for U.S. Appl. No. 17/510,043 mailed Apr. 29, 2022, pp. 1-10.
Office Communication for U.S. Appl. No. 17/115,529 mailed Apr. 29, 2022, pp. 1-4.
Office Communication for U.S. Appl. No. 17/491,017 mailed May 12, 2022, pp. 1-50.
Office Communication for U.S. Appl. No. 17/484,167 mailed May 17, 2022, pp. 1-3.

(56) References Cited

OTHER PUBLICATIONS

Office Communication for U.S. Appl. No. 17/484,167 mailed Jun. 10, 2022, pp. 1-5.
Office Communication for U.S. Appl. No. 17/203,452 mailed Jun. 22, 2022, pp. 1-22.
Office Communication for U.S. Appl. No. 14/595,598 mailed Jul. 13, 2022, pp. 1-9.
Office Communication for U.S. Appl. No. 17/062,500 mailed Jul. 26, 2022, pp. 1-20.
Office Communication for U.S. Appl. No. 17/588,120 mailed Jul. 27, 2022, pp. 1-34.
Office Communication for U.S. Appl. No. 17/062,500 mailed Oct. 5, 2022, pp. 1-4.
Office Communication for U.S. Appl. No. 17/203,452 mailed Oct. 19, 2022, pp. 1-9.
Office Communication for U.S. Appl. No. 17/588,120 mailed Oct. 21, 2022, pp. 1-5.
Office Communication for U.S. Appl. No. 17/203,452 mailed Nov. 9, 2022, pp. 1-2.
Office Communication for U.S. Appl. No. 17/588,895 mailed Nov. 9, 2022, pp. 1-11.
Office Communication for U.S. Appl. No. 17/954,640 mailed Nov. 30, 2022, pp. 1-10.
Office Communication for U.S. Appl. No. 17/115,529 mailed Dec. 9, 2022, pp. 1-21.
Office Communication for U.S. Appl. No. 18/503,918 mailed Jan. 31, 2024, 8 Pages.
Office Communication for U.S. Appl. No. 18/503,918 mailed Jan. 24, 2024, 12 Pages.
Office Communication for U.S. Appl. No. 18/503,791 mailed Jan. 4, 2024, 27 Pages.
Office Communication for U.S. Appl. No. 17/115,529 mailed Jan. 12, 2024, 26 Pages.
Office Communication for U.S. Appl. No. 14/595,598 mailed May 16, 2019, 18 Pages.
Office Communication for U.S. Appl. No. 16/152,277 mailed Oct. 26, 2021, 2 Pages.
Office Communication for U.S. Appl. No. 16/741,567 mailed Feb. 24, 2022, 2 Pages.
Office Communication for U.S. Appl. No. 17/504,289 mailed Apr. 20, 2022, 2 Pages.
Office Communication for U.S. Appl. No. 16/659,488 mailed May 6, 2020, 8 Pages.
International Preliminary Report on Patentability Chapter I for International Patent Application No. PCT/US2021/023531 mailed Aug. 4, 2022, 5 Pages.
International Preliminary Report on Patentability Chapter I for International Patent Application No. PCT/US2021/023525 mailed Aug. 4, 2022, 5 Pages.
International Preliminary Report on Patentability Chapter I for International Patent Application No. PCT/US2016/038242 mailed Dec. 28, 2017, 8 Pages.
Office Action for European Patent Application No. 17206518.7 mailed Mar. 15, 2022, 5 Pages.
Office Communication for European Patent Application No. 17206518.7 mailed Sep. 30, 2022, 8 Pages.
Office Communication for U.S. Appl. No. 17/508,869 mailed Mar. 8, 2022, 2 Pages.
Office Communication for U.S. Appl. No. 17/508,869 mailed Jan. 5, 2022, 3 Pages.
Office Communication for U.S. Appl. No. 17/530,420 mailed May 4, 2022, 3 Pages.
Office Communication for U.S. Appl. No. 17/530,420 mailed May 12, 2022, 3 Pages.
Office Communication for European Patent Application No. 16812585.4 mailed Apr. 1, 2021, 9 pages.
Office Communication for U.S. Appl. No. 17/115,529 mailed Dec. 13, 2023, 4 Pages.
Office Communication for U.S. Appl. No. 17/115,529 mailed Sep. 12, 2023, 25 Pages.
Office Communication for U.S. Appl. No. 18/070,705 mailed Sep. 7, 2023, 5 Pages.
Office Communication for European Patent Application No. 18155779.4 mailed Jun. 12, 2020, 10 Pages.
Office Communication for U.S. Appl. No. 16/004,182 mailed Mar. 17, 2022, 7 Pages.
Office Communication for U.S. Appl. No. 16/226,587 mailed Jan. 27, 2020, 13 Pages.
Office Communication for U.S. Appl. No. 16/262,790 mailed Nov. 8, 2019, 5 Pages.
Office Communication for U.S. Appl. No. 18/583,746 mailed May 14, 2024, 21 Pages.
Office Communication for U.S. Appl. No. 18/590,088 mailed Apr. 24, 2024, 18 Pages.
Office Communication for U.S. Appl. No. 18/590,088 mailed May 2, 2024, 13 Pages.
Office Communication for U.S. Appl. No. 18/503,082 mailed May 15, 2024, 27 Pages.
Office Communication for U.S. Appl. No. 18/070,705 mailed Feb. 22, 2024, 7 Pages.
Office Communication for U.S. Appl. No. 18/503,082 mailed Feb. 29, 2024, 26 Pages.
Office Communication for U.S. Appl. No. 18/070,705 mailed Mar. 5, 2024, 2 Pages.
Office Communication for U.S. Appl. No. 17/115,529 mailed Mar. 26, 2024, 27 Pages.
Office Communication for U.S. Appl. No. 17/115,529 mailed May 22, 2023, pp. 1-25.
Office Communication for U.S. Appl. No. 17/062,500 mailed Jun. 13, 2023, pp. 1-8.
Office Communication for U.S. Appl. No. 18/070,705 mailed Jun. 20, 2023, pp. 1-16.
Office Communication for U.S. Appl. No. 17/491,017 mailed Aug. 8, 2023, pp. 1-13.
Office Communication for U.S. Appl. No. 17/588,120 mailed Feb. 1, 2023, pp. 1-15.
Office Communication for U.S. Appl. No. 17/491,017 mailed Feb. 10, 2023, pp. 1-57.
Office Communication for U.S. Appl. No. 18/070,705 mailed Feb. 23, 2023, pp. 1-14.
Office Communication for U.S. Appl. No. 17/062,500 mailed Feb. 27, 2023, pp. 1-23.
Office Communication for U.S. Appl. No. 17/954,640 mailed Mar. 15, 2023, pp. 1-9.
Office Communication for U.S. Appl. No. 17/491,017 mailed May 4, 2023, pp. 1-6.
Office Communication for U.S. Appl. No. 17/973,944 mailed May 10, 2023, pp. 1-9.
Marcus Jurgens, "Aggregated Data in Tree-Based Index Structures" in Index Structures for Data Warehouses, LNCS 1859, Springer, Year: 2002, pp. 43-62.
Office Communication for U.S. Appl. No. 18/503,082 mailed Jun. 25, 2024, 4 Pages.
Office Communication for U.S. Appl. No. 18/503,082 mailed Sep. 6, 2024, 27 Pages.

* cited by examiner

WORKLOAD ALLOCATION FOR FILE SYSTEM MAINTENANCE

TECHNICAL FIELD

The present invention relates generally to file systems, and more particularly, but not exclusively, to managing workload allocation for file system maintenance.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various high volume or large capacity snapshot mechanisms to support various features such as backup operations, archival operations, or the like. However, naïve snapshot management strategies may cause significant performance overhead that may be disadvantageous to users or overall operation of the file system. For example, in some cases, unmanaged deletion of large snapshots may overwhelm one or more performance capabilities of the file system. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
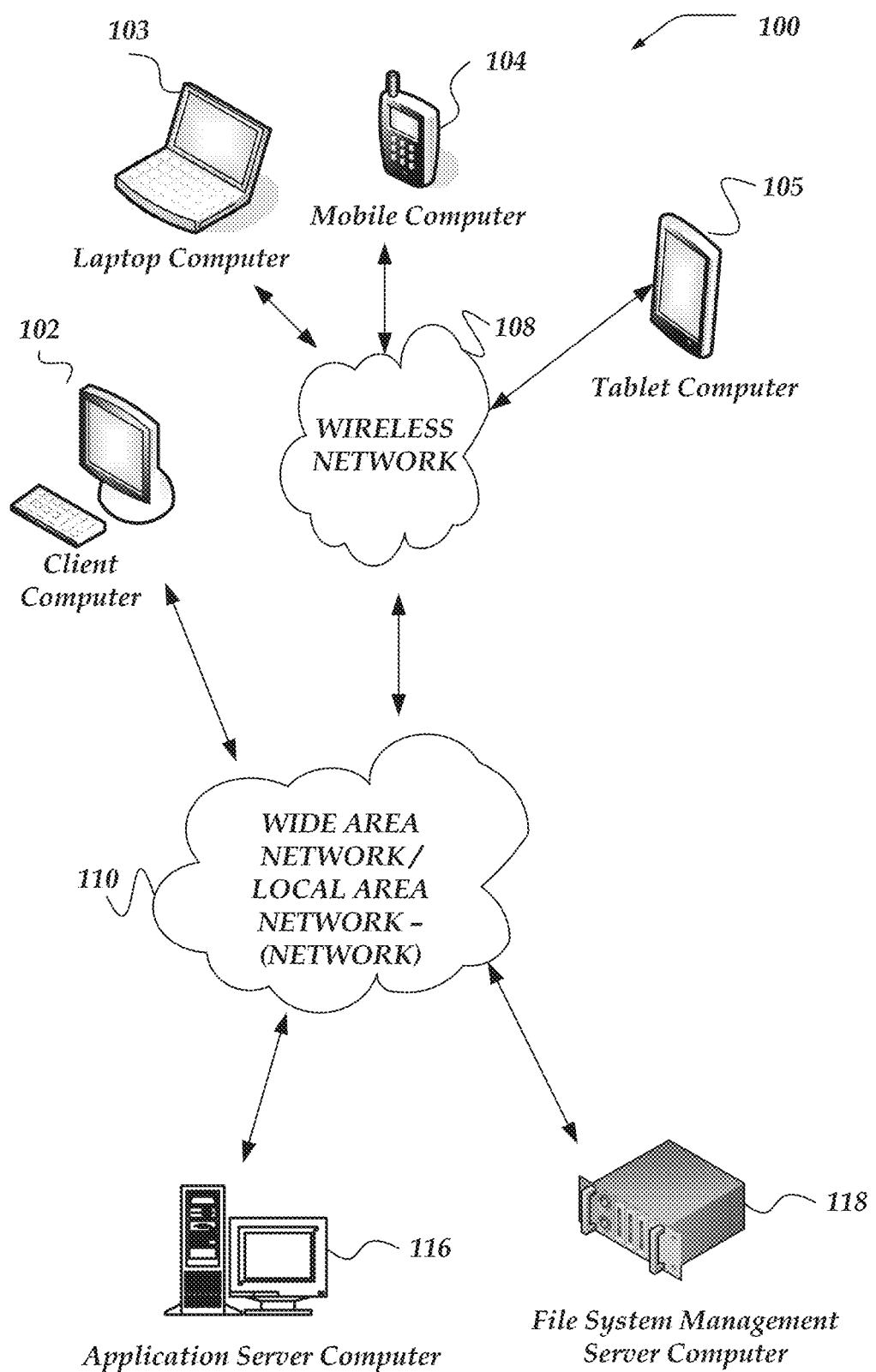
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VB Script, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the terms "epoch," or "file system epoch" refer to time periods in the life of a file system. Epochs may be generated sequentially such that epoch 1 comes before epoch 2 in time. Prior epochs are bounded in the sense that they have a defined beginning and end. The current epoch has a beginning but not an end because it is still running. Epochs may be used to track the birth and death of file system objects, or the like.

As used herein the term "snapshot" refers to a point time version of the file system or a portion of the file system. Snapshots preserve the version of the file system objects at the time the snapshot was taken. In some cases, snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to count epochs and snapshots sequentially, the epoch value or its number label may be assumed to be greater than the number label of the newest snapshot. Epoch boundaries may be formed if a snapshot is taken. The epoch (e.g., epoch count value) may be incremented if a snapshot is created. Each epoch boundary is created when a snapshot was created. In some cases, if a new snapshot is created, it may be assigned a number label that has the same as the epoch it is closing and thus be one less than the new current epoch that begins running when the new snapshot is taken. Note, other formats of snapshots are contemplated as well as, such as, backups, archive file, various types of file repositories, or the like. One of ordinary skill in the art will appreciate that snapshots associated with epochs or snapshot numbers as described herein as examples that at least enable or disclose the innovations described herein.

As used herein the term "deleted snapshot" refers to a snapshot that has been designated for deletion. Deletion or storage space recovery of file system objects associated with deleted snapshots may be carefully managed to limit the performance impact that may be associated with deleting many file system objects at the same time.

As used herein the term "dead block" refers to file system data blocks that are only referenced by deleted snapshots. Users may not access dead blocks because dead blocks may appear to be 'deleted' to users even though the dead blocks consume file system storage space.

As used herein the term "dead tree" refers to one or more data structures that may be used to manage dead blocks. Dead trees may be distributed across multiple storage nodes in file system for data protection or performance considerations.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to workload allocation for file system maintenance. In one or more of the various embodiments, the file system that includes one or more storage nodes and a plurality of snapshots may be provided such that each snapshot may be associated with a plurality of data blocks.

In one or more of the various embodiments, in response to deleting one or more snapshots of the plurality of snapshots further actions may be performed, including: determining a plurality of dead blocks associated with the one or more deleted snapshots such that each dead block may be a data block that may be unassociated with one or more undeleted snapshots; adding the plurality of dead blocks to a plurality of dead trees located on the one or more storage nodes; determining an urgency score based on a workload model and one or more file system metrics; determining one or more delete tasks based on the urgency score; determining a portion of the storage nodes based on a number of delete tasks; and executing the one or more delete tasks on the portion of storage nodes to perform further actions including: determining one or more dead blocks on the portion of storage nodes that are associated with the one or more deleted snapshots; and deleting the one or more determined dead blocks such that a storage capacity associated with the one or more deleted dead blocks may be returned to the file system.

In one or more of the various embodiments, determining the one or more file system metrics may include determining one or more of a count of the plurality of snapshots or an amount of available storage capacity in the file system.

In one or more of the various embodiments, determining the one or more dead blocks on the portion of storage nodes may include: determining one or more dead trees on the one or more storage nodes such that each dead tree may include a plurality of dead blocks associated with a plurality of deleted snapshots; traversing the one or more determined dead trees to identify the one or more dead blocks associated with the one or more deleted snapshots; or the like.

In one or more of the various embodiments, in response to a completion of the one or more delete tasks, further actions may be performed, including: determining a remainder portion of the one or more storage nodes such that the execution of the one or more delete tasks excluded the remainder portion of storage nodes; further executing the one or more delete tasks on the remainder portion of storage nodes; or the like.

In one or more of the various embodiments, deleting the one or more determined dead blocks may include: determining a portion of the one or more determined dead blocks that may correspond to a storage capacity of a storage node in the file system based on the portion of the one or more determined dead blocks; providing a delete message to the storage node such that the storage node deletes the portion of the one or more determined dead blocks.

In one or more of the various embodiments, deleting the one or more snapshots of the plurality of snapshots may include: adding the one or more deleted snapshots to a deleted snapshot queue; in response to deleting each dead block associated with the one or more deleted snapshots, removing the one or more deleted snapshots from the deleted snapshot queue.

In one or more of the various embodiments, adding the plurality of dead blocks to the plurality of dead trees may include: determining one or more portions of the plurality of dead blocks; randomly determining a storage node in the file system; determining a dead tree stored on the randomly determined storage node; adding the portion of dead blocks to the determined dead tree; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
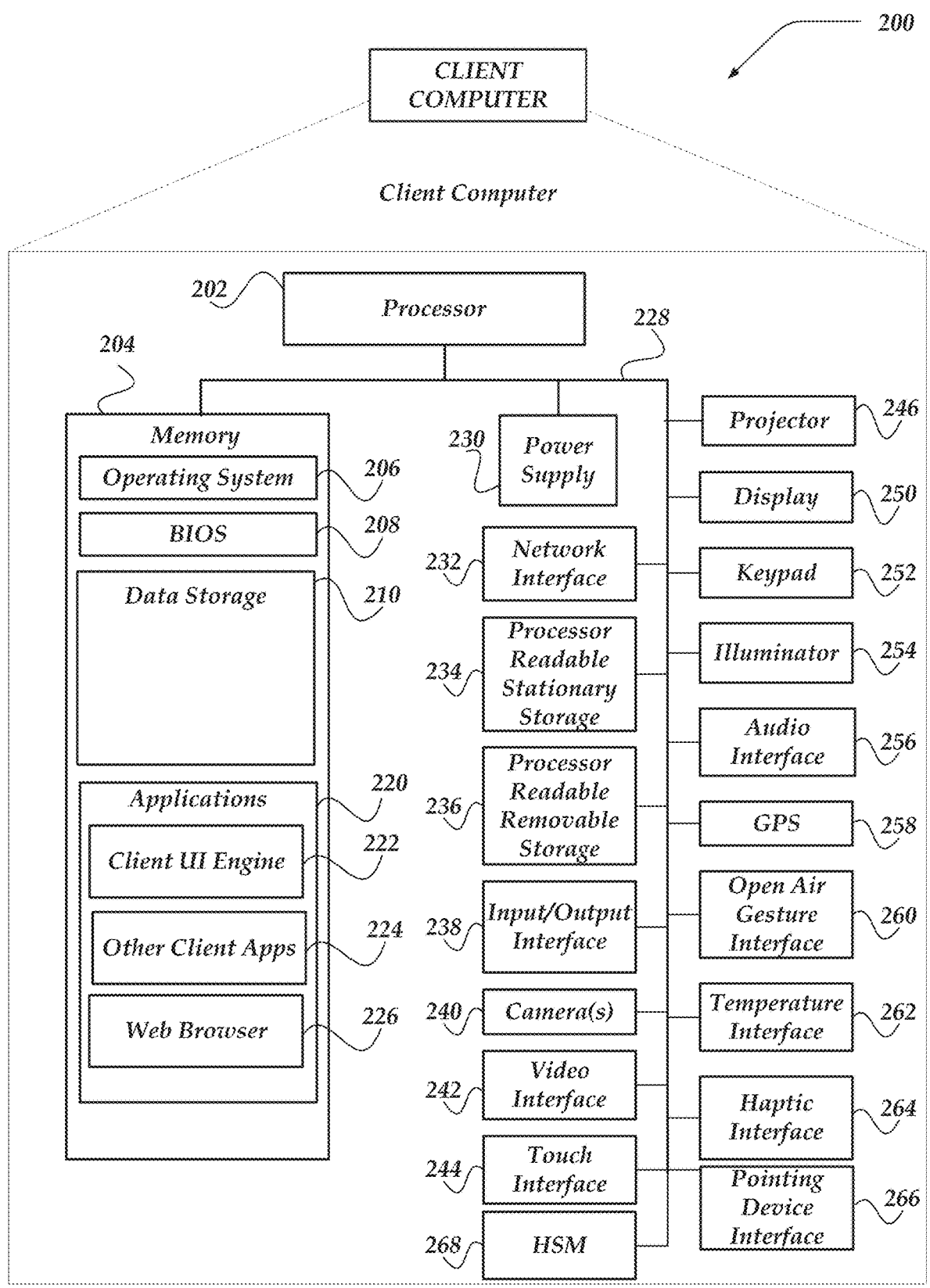
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
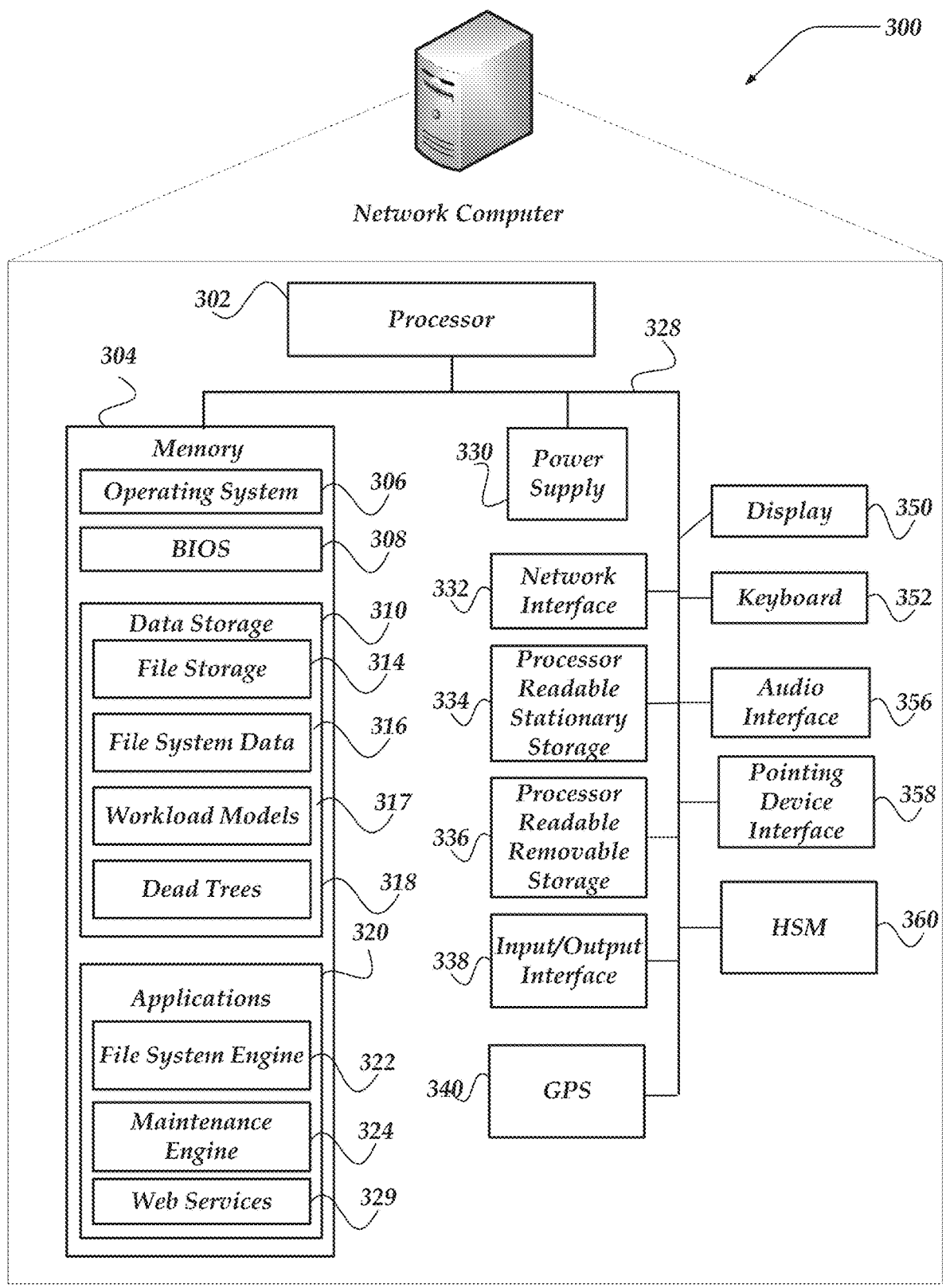
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, maintenance engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, workload models 317, dead trees 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, maintenance engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, maintenance engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, maintenance engine 324, web services 329, or the like, may be provisioned and de-commissioned automatically.

Also, in one or more of the various embodiments, file system engine 322, maintenance engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
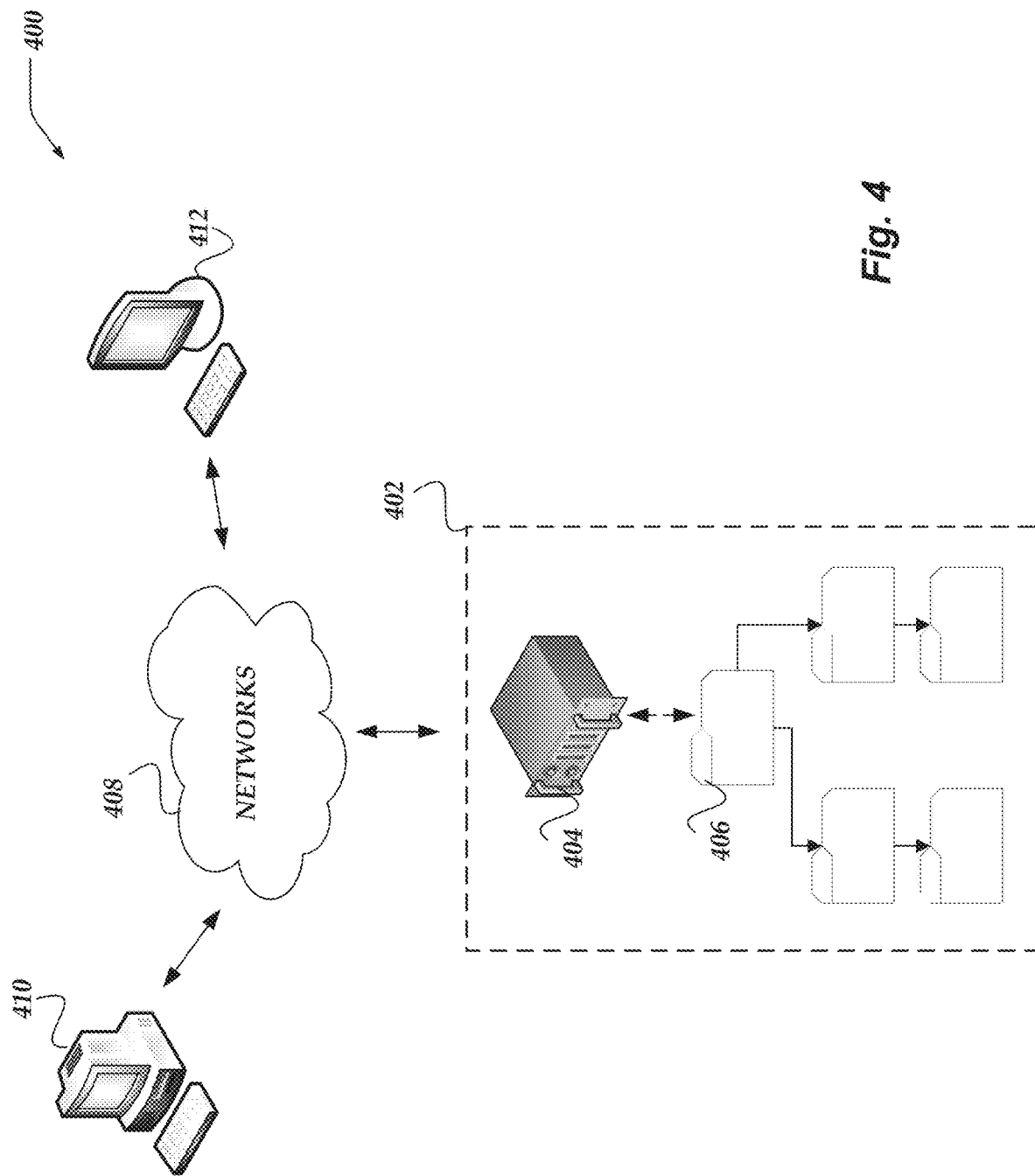
FIG. 4 illustrates a logical architecture of a system for workload allocation for file system maintenance in accordance with one or more of the various embodiments.

FIG. 4 illustrates a logical architecture of system 400 for workload allocation for file system maintenance in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include, files, documents, directories, folders, backups, snapshots, replication snapshots, replication information, or the like. In some embodiments, some file system objects may be comprised of smaller file system objects. Accordingly, in some embodiments, blocks or data blocks may be considered to be smallest file system objects that comprise other more complex file system objects, such as, files, documents, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that may include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
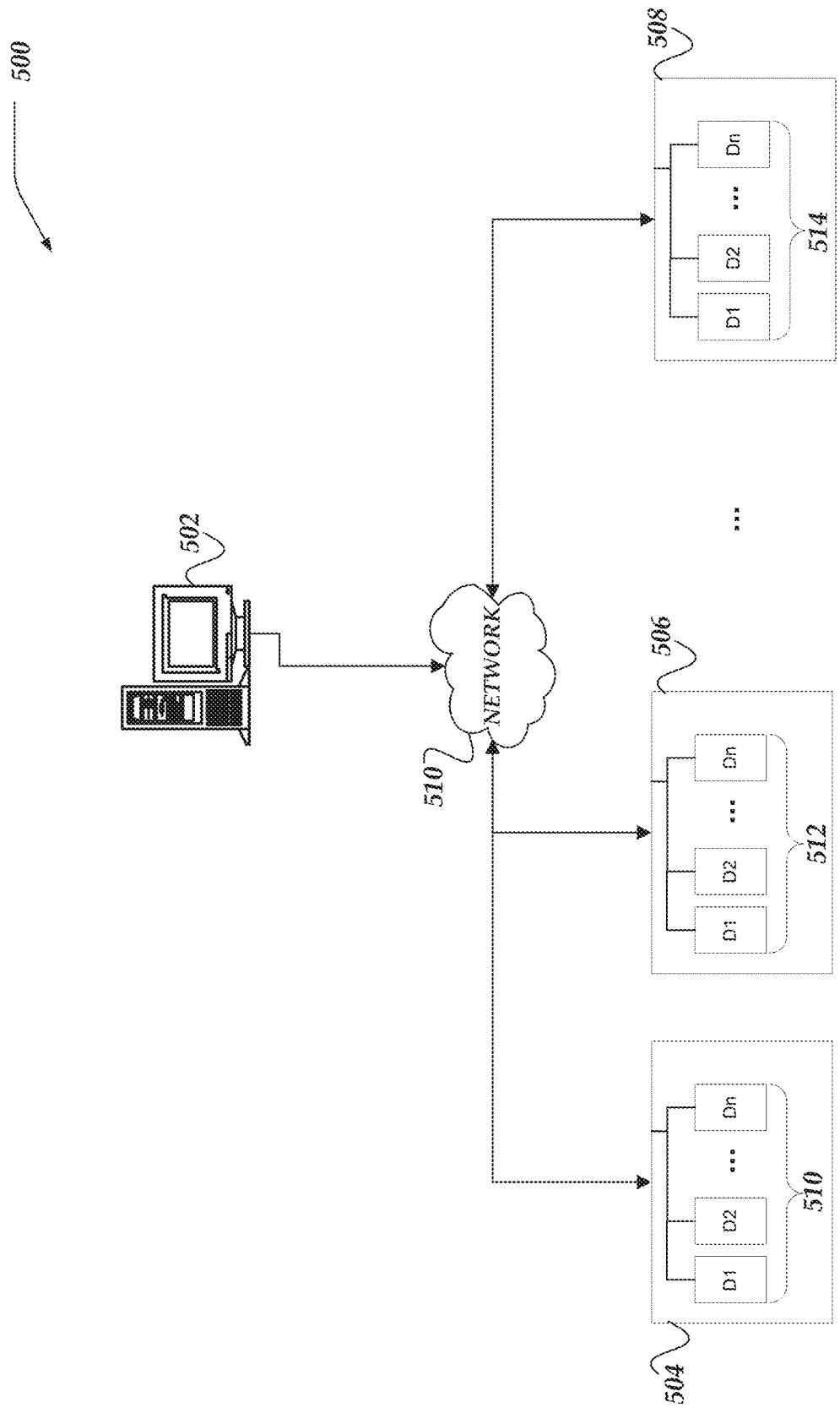
FIG. 5 shows a system that is a portion of a data storage system for workload allocation for file system maintenance in distributed file systems in accordance with at least one of the various embodiments.

FIG. 5 shows system 500 that is a portion of a data storage system for workload allocation for file system maintenance in distributed file systems in accordance with at least one of the various embodiments. In at least one of the various embodiments, system 500 may be comprised of a file system management server computer, such as, file system management server computer 502, as well as, one or more storage computers, such as, storage node 504, storage node 506, storage node 508, or the like. In at least one of the various embodiments, file system management server computer 502, storage node 504, storage node 506, or storage node 508, may be comprised of network computers, similar to network computer 300.

In at least one of the various embodiments, each storage node may be interconnected over a network, such as, network 510. In at least one of the various embodiments, network 510 may be considered to be similar to one or more of wireless network 108 or network 110.

In at least one of the various embodiments, the storage nodes may be arranged to include one or more storage volumes, such as, storage volumes 510, storage volumes 512, or storage volumes 514. In various embodiments, storage nodes may include more or fewer storage volumes than illustrated in FIG. 5. In at least one of the various embodiments, storage nodes may include a single storage volume. And, in some embodiments, one or more storage nodes may be arranged to be included in an enclosure or chassis which in turn may be interconnected to other computer or storage nodes over network 510.

In one or more of the various embodiments, storage volumes may be comprised of one or more physical storage devices, such as, hard disk drives (HDDs), solid state drives (SSDs) or the like. In one or more of the various embodiments, one or more storage volumes may be comprised virtualized storage objects provided by a cloud computing environment.

In at least one of the various embodiments, the functionality of file system management server computer 502 may be incorporated directly into one or more storage nodes, such as, storage node 504, storage node 506, storage node 508, or the like. In such embodiments a file system management application, such as, file system engine 322 or maintenance engine 324 may be operative on one or more of the storage nodes. Further, in at least one of the various embodiments, some or all functionality of the file system management server computer may be implemented directly on each storage node.

Further, in at least one of the various embodiments, file system management server computer 502 may be arranged to manage one or more distributed tasks of varying types that may be executed on the file system. In at least one of the various embodiments, task types may include, repair tasks, erasure coding (e.g., encoding and decoding) tasks, distributed data writes, cryptographic tasks, compression tasks, decompression tasks, arbitrary compute tasks, delete tasks, garbage collection tasks, or the like.

Figure 6:
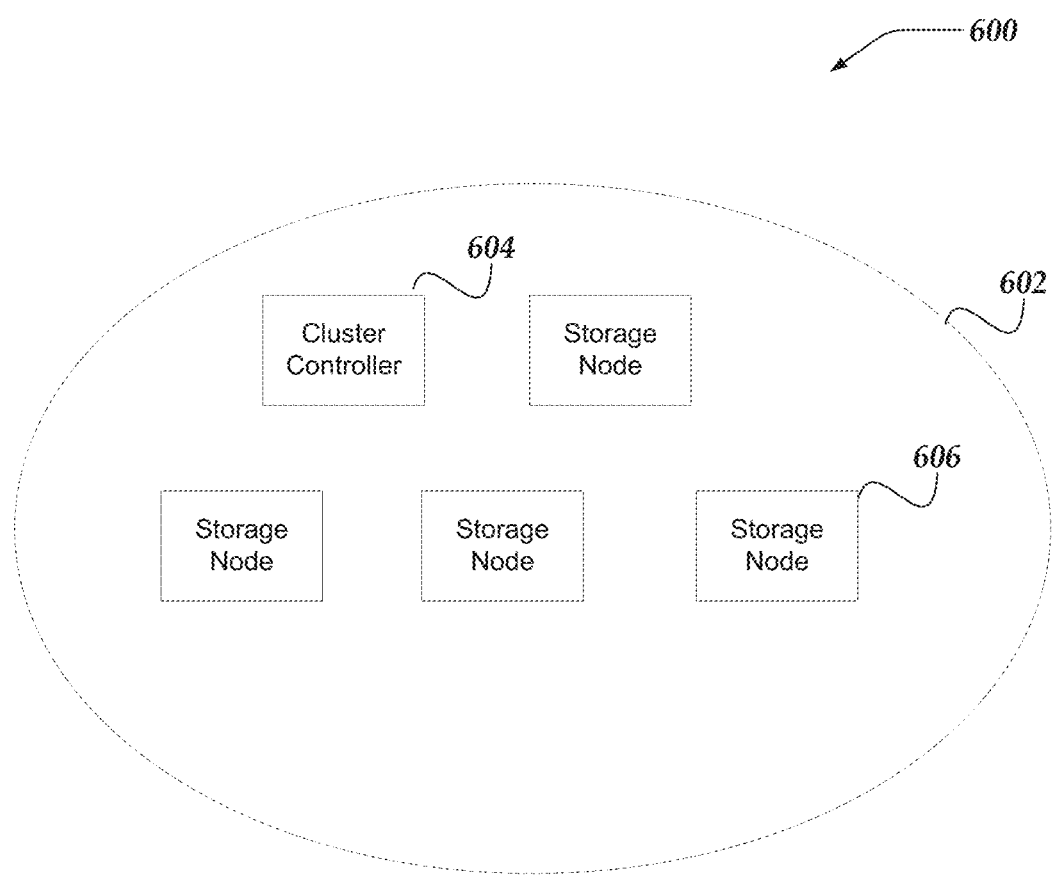
FIG. 6 illustrates a logical schematic of a file system in a cloud-computing environment for workload allocation for file system maintenance in accordance with one or more of the various embodiments.

FIG. 6 illustrates a logical schematic of file system 600 in a cloud-computing environment for workload allocation for file system maintenance in accordance with one or more of the various embodiments. As introduced above, file systems may be hosted or implemented in a cloud computing environment, such as, cloud computing environment 600.

In one or more of the various embodiments, cluster 602 may be a virtualized file system cluster hosted in cloud computing environment 600. In this example, the boundary of cluster 602 is illustrated using a dashed line to represent the dynamic or elastic nature of a cloud-hosted file system cluster. Accordingly, in some embodiments, the innovations disclosed herein anticipate various conventional cloud computing features, such as, programmatically/dynamically provisioning components, such as, compute instances, storage volumes, or the like. Also, in some embodiments, innovations may rely on other programmatic/dynamic features often provided by cloud computing environments, such as, network configuration, grouping or association of various cloud environment components with other components, component/object tagging systems, component/object labeling, or the like.

Figure 7:
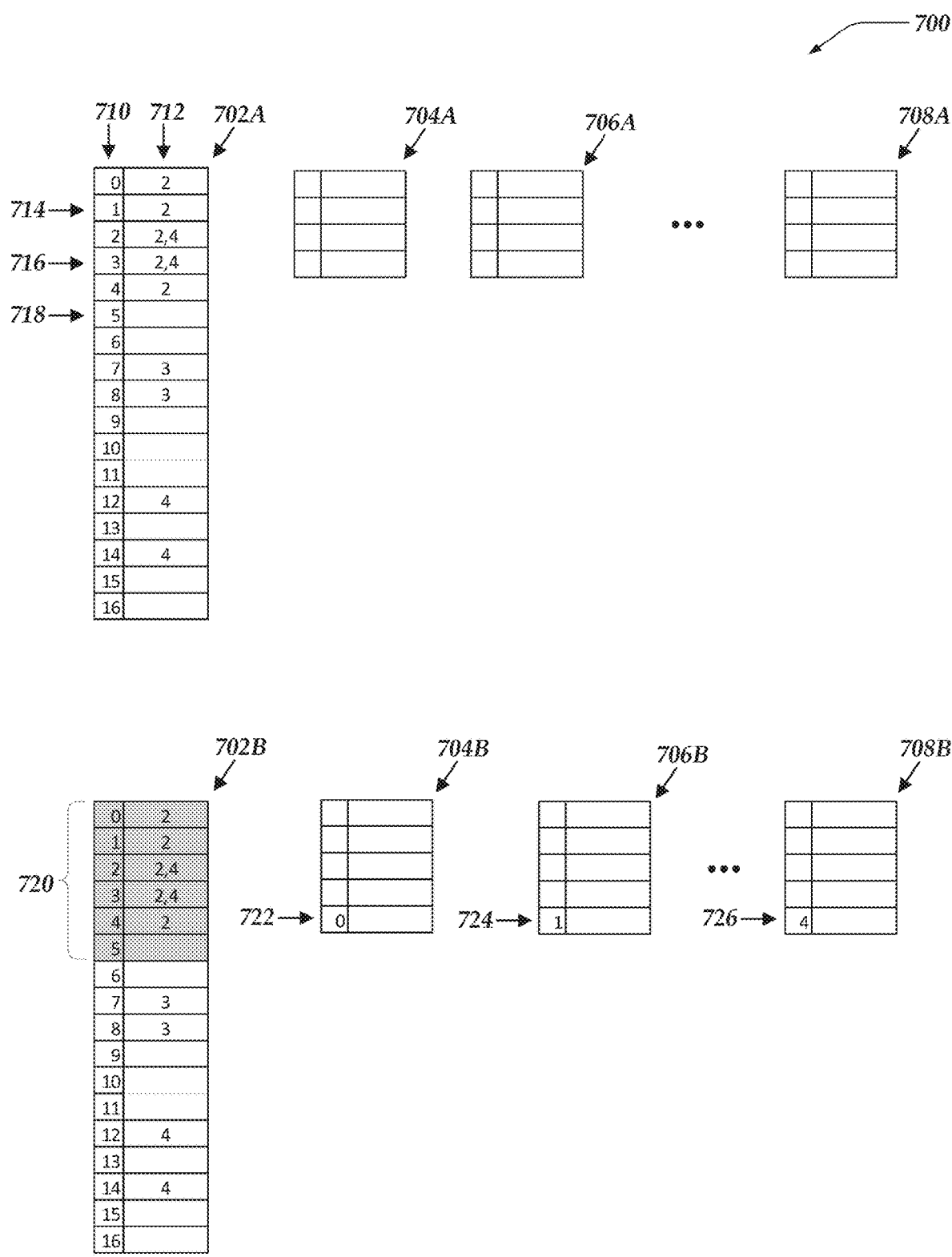
FIG. 7 illustrates a logical schematic of a file system for workload allocation for file system maintenance in distributed file systems in accordance with one or more of the various embodiments.

FIG. 7 illustrates a logical schematic of file system 700 for workload allocation for file system maintenance in distributed file systems in accordance with one or more of the various embodiments. In some embodiments, file systems may comprise various data structures (e.g., indexes, inodes, tables, b-trees, or the like) for managing the state of the file system. In some embodiments, as file system operations occur (e.g., user driven, or maintenance driven) file system engines may be arranged to update the various data structures to maintain an operational file system.

Figure 8:
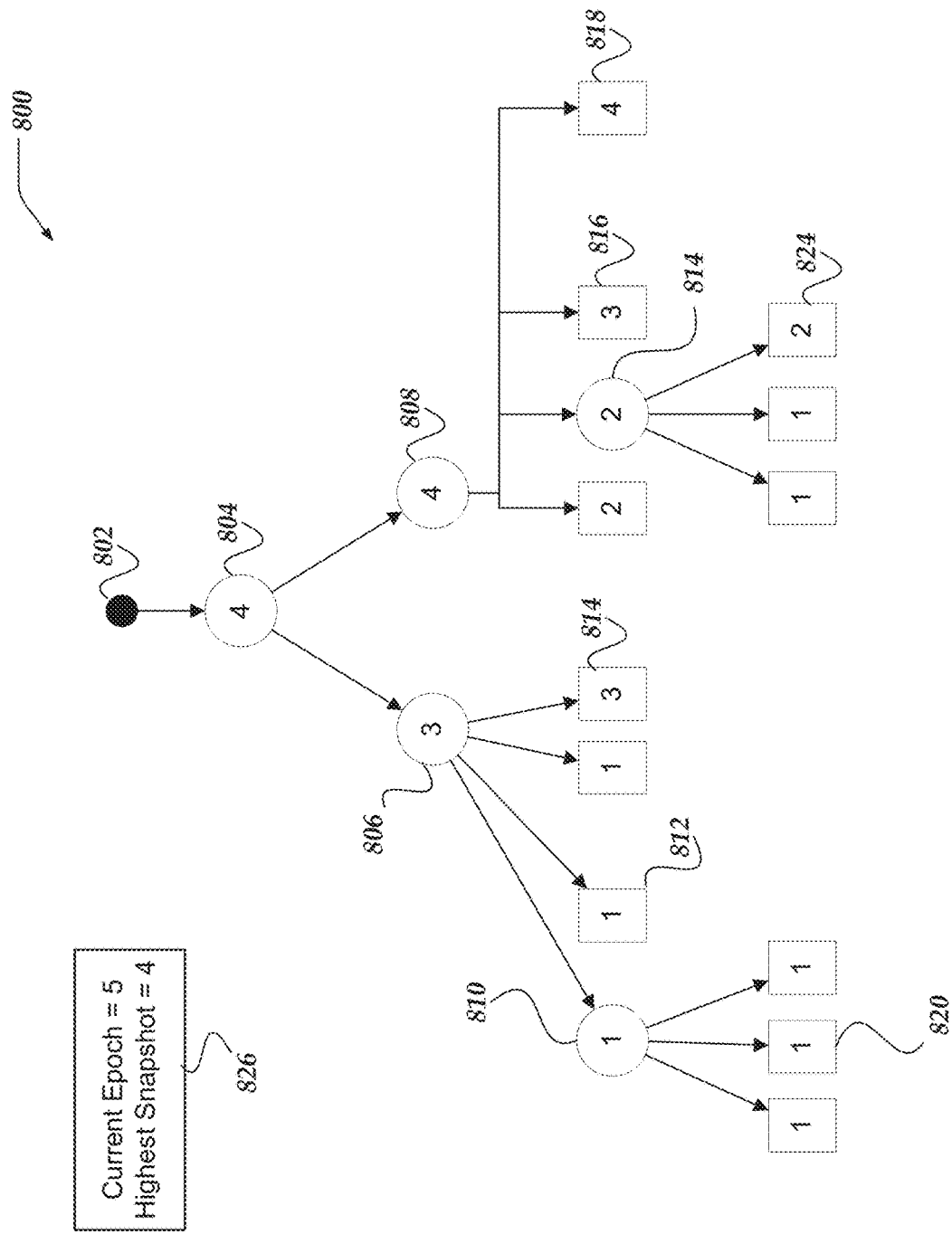
FIG. 8 illustrates a logical representation of a file system for workload allocation for file system maintenance in accordance with one or more of the various embodiments.

In some embodiments, a file system may support snapshots that may be arranged to associate collections of file system objects to enable various actions, such as, replication, mirroring, version control, backups, archiving, or the like. FIG. 8 below provides a detailed description of an embodiment for providing snapshots. However, in some embodiments, different types of file systems may employ different schemes for maintaining snapshots, versions, branches, backups, archive collections, or the like, that are designed to include or associate particular file system objects into collections. For brevity and clarity, the term snapshots may be considered to refer to various types of file system object collections that may be generated by various manual or automatic processes in a file system.

In one or more of the various embodiments, file systems may include one or more indexes that store information related to the state or location of data blocks that comprise file system objects. For example, if a user stores a file that results in ten data blocks, the file system engines may store the individual blocks in the file system accordingly to one or more allocation schemes. In some distributed file systems, data blocks associated with the same file system objects may be distributed across multiple storage nodes or storage volumes depending on data protection/recovery schemes that may be in place. For example, if a file system has ten nodes, the protection scheme may distribute one or more data blocks of the same file system objects to all ten nodes. The particular distribution of blocks in file system may vary depending on protection level requirements, erasure coding algorithms, performance constraints, storage capacity, local requirements, user preferences, or the like.

In this example, for some embodiments, index 702A represents a file system index that stores information about data blocks in the file system. In this example, column 710 may store identifiers that may be used for referencing/ identifying blocks. For brevity and clarity, this example uses simple integers as examples of block identifiers. However, one of ordinary skill in the art will appreciate that different identification schemes may be used to identify blocks in a file system. Also, in this example, for some embodiments, column 712 may be considered to store various meta-data associated with a block, such as, access rights (e.g., read-write permissions), timestamps, cache information (e.g., time last read, or the like), age, or the like.

In this example, for some embodiments, column 712 may also store information that indicates if the block is associated with one or more snapshots. Note, one of ordinary skill in the art will appreciate that in a production environment, file systems may employ indexes that employ various schemes such as run-length encoding, or the like, to compress or otherwise reduce the size of indexes. Likewise, in some embodiments, indexes may be implemented using various data structures, such as, b-trees, tables, hash maps, dictionaries, or the like, or combination thereof. Also, in some embodiments, file systems may employ hybrid or custom data structures for representing various indexes used to identify blocks or associate meta-data with blocks. Here, for brevity and clarity, index 702A and index 702B are represented using a simplified table.

Accordingly, in this example, if column 712 of a record has an integer value, it represents a snapshot that includes the data block. Thus, in this example, row 714 shows that block #1 is included in snapshot 2. Similarly, in this example, row 716 shows that block #3 is included in snapshot 2 and snapshot 4. And, similarly, row 718 shows that block #5 is not included in a snapshot.

In some embodiments, ordinarily, if users or other processes delete a block in the file system, file system engines may be arranged to immediately destroy the block and release it corresponding storage capacity back to the file system. However, if blocks designated for deletion are associated with one or more snapshots, those blocks must be preserved until the associated snapshots are designated for deleting.

In some embodiments, if a snapshot is designated for deletion, blocks in the file system that are not included in other snapshots may be deleted and their capacity may be restored to the file system. Note, in some embodiments, blocks associated with more than one snapshot may be preserved until all of the snapshots it may be associated with are designated for deletion.

One of ordinary skill in the art will appreciate that data allocation schemes in large distributed file systems may distribute blocks across some or all storage nodes depending on protection schemes, erasure coding, data reliability guarantees, or the like.

Accordingly, in some embodiments, naively deleting all the blocks associated with a deleted snapshot may detrimentally impact the overall performance or responsiveness of a file system. For example, if a snapshot designated for deletion has a million files each with thousands of blocks distributed across a dozen storage nodes, a naive delete of the snapshot may trigger so many simultaneous delete operations that the overall performance of the file system may be impacted, causing other critical operations to be delayed or otherwise starved of resources. Likewise, in some embodiments, if snapshot deletion itself is naively throttled, the time required to delete the blocks associated with a snapshot may be prohibitive. For example, a naive snapshot deletion scheme may be configured to deleted one block or one file at time, in large distributed file systems such a scheme may run so slow that snapshots are not timely deleted. Thus, in this example, blocks or files associated with deleted snapshots (or snapshots designated for deletion) may disadvantageously consume significant storage capacity of a file system. In some cases, this may result in the storage capacity of the file system being consumed before blocks associated with deleted snapshots may be recovered to free more space to make available for storing new data in the file system.

Accordingly, in some embodiments, if snapshots may be designated for deletion, file system engines may determine if there are blocks associated with the deleted snapshots that should be deleted from file system. In some embodiments, such blocks may be referred to as dead blocks. In some embodiments, dead blocks may be considered blocks that are only referenced by snapshots designated for deletion. Thus, in some embodiments, if a block, such as, block #3 (row 716) is associated with two or more snapshots, designating one of the associated snapshots for deletion does make block #3 a dead block because it is included in at least one other snapshot.

In one or more of the various embodiments, data structures for managing/tracking dead blocks may be referred to as dead trees. In some embodiments, dead trees may be distributed across one or more storage nodes rather than being located in one centralized location. Accordingly, in some embodiments, data protection schemes similar to those used to protect data blocks may be applied to important data structures such as dead trees.

Accordingly, dead tree 704A, dead tree 706A, dead tree 708A, or the like, may represent dead tree data structures that are located on different storage nodes in a file system.

In this example, for some embodiments, block run 720 represents a portion of blocks in a file system that have been designated for deletion by a user or other process. In some embodiments, if blocks are 'deleted' by a user, users may be disabled from accessing them in the mainline file system. Thus, in some embodiments, typically user tools that show directory listings, user file operations, and so on, will treat all the deleted blocks as if the blocks are no longer are present in the file system. But in this example, for some embodiments, blocks included in a snapshot may remain in place in the file system because of their inclusion in snapshots. Thus, block #5 (row 718) may be immediately deleted from the file system and its storage space returned to the file system because it is not included in a snapshot.

Also, in some embodiments, if snapshot #2 is designated for deletion, all of its included blocks that are not associated with another snapshot may be deemed dead blocks. Accordingly, in some embodiments, the dead blocks associated with a deleted snapshot may be added to dead trees that may be distributed across the file system.

In this example, for some embodiments, the dead blocks associated with snapshot #2 have been added to dead tree 704B, dead tree 706B, or dead tree 708B. Note, in this example, block #2 and block #3 are not considered dead blocks because they remain included in snapshot #4. Similarly, in this example, block #5 is not considered a dead block because it was not included in any snapshot, so it may be deleted immediately, and its storage space returned to the file system.

Accordingly, in this example, for some embodiments, row 722 represents that dead block #0 is added to dead tree 704B. Similarly, row 724 represents that dead block #1 is added to dead tree 706B. And, similarly, row 726 represents that dead block #4 is added to dead tree 708B.

In one or more of the various embodiments, file systems may be arranged to distribute one or more dead trees across one or more storage nodes in a file system cluster. Accordingly, in some embodiments, file system engines may be arranged to distribute dead blocks across the available dead trees. For example, in some embodiments, file system engines may be configured to randomly select which dead tree a given dead block may be assigned.

In one or more of the various embodiments, if maintenance engines determine that the dead blocks associated with 'deleted' snapshots may be deleted to recover storage capacity, maintenance engines may be arranged to enable storage nodes to walk one or more of their dead trees and issue commands to free the storage space of associated with dead blocks.

FIG. 8 discloses how, one or more of the various embodiments may be arranged to manage or generate snapshots. However, in some embodiments, the innovations described herein are not limited to a particular form or format of snapshots, point-in-time snapshots, or the like. Accordingly, in some embodiments, maintenance engines may be arranged to employ snapshots generated differently than described herein. And, one of ordinary skill in the art will appreciate that file systems may employ various snapshot mechanisms or snapshot facilities. Thus, one of ordinary skill in the art will appreciate that the descriptions below are at least sufficient for disclosing the innovations included herein while not being limited a particular type of snapshot implementation.

FIG. 8 illustrates a logical representation of file system 800 for workload allocation for file system maintenance in accordance with one or more of the various embodiments. In this example, for clarity and brevity file system 800 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing information for implementing a file system, such as, file system 800.

In this example, circles are used to illustrate directory/folder file system objects. And, rectangles are used to represent other file system objects, such as, files, documents, or the like. The number in the center of the file system object represents the last/latest snapshot associated with the given file system object.

In this example, for some embodiments, root 802 is the beginning of a portion of a file system. Root 802 is not a file system object per se, rather, it indicates a logical position (e.g., root of the file system) in a distributed file system. Directory 804 represents the parent file system object of all the objects under root 802. Directory 804 is the parent of directory 806 and directory 808. Directory 810, file object 812, and file object 814 are children of directory 806; directory 814, file object 816, and file object 818 are direct children of directory 808; file object 820 is a direct child of directory 810; and file object 824 is a direct child of directory 814. Also, in this example, for some embodiments, meta-data 826 includes the current update epoch and highest snapshot number for file system 800.

In this example, file system objects in file system 800 are associated with snapshots ranging from snapshot 1 to snapshot 4. The current epoch is number 5. Each time a snapshot is generated, the current epoch may be ended and the new snapshot is associated with ending the current epoch. A new current epoch may then be generated by incrementing the last current epoch number. Accordingly, in this example, if another snapshot is generated, it will have a snapshot number of 5 and the current epoch will become epoch 6.

In one or more of the various embodiments, at steady-state, parent file system objects, such as, directory 804, directory 806, directory 808, directory 810, directory 814, or the like, have a snapshot number based on the most recent snapshot associated with any of its children. For example, in this example, directory 804 has a snapshot value of 4 because its descendant, file object 818 has a snapshot value of 4. Similarly, directory 808 has the same snapshot value as file object 818. Continuing with this example, this is because file object 818 was modified or created sometime after snapshot 3 was generated and before snapshot 4 was generated.

In one or more of the various embodiments, if file system objects are not modified subsequent to the generation follow-on snapshots, they remain associated with their current/last snapshot. For example, in this example, directory 814 is associated with snapshot 2 because for this example, it was modified or created after snapshot 1 was generated (during epoch 2) and has remained unmodified since then. Accordingly, by observation, a modification to file object 824 caused it to be associated with snapshot 2 which forced its parent, directory 814 to also be associated with snapshot 2. In other words, for some embodiments, if a file system object is modified in a current epoch, it will be associated with the next snapshot that closes or ends the current epoch.

Compare, for example, in some embodiments, how directory 810 is associated with snapshot 1 and all of its children are also associated with snapshot 1. This indicates that directory 810 and its children were created during epoch 1 before the first snapshot (snapshot 1) was generated and that they have remained unmodified subsequent to snapshot 1.

In one or more of the various embodiments, if file system 800 is being replicated, a replication engine, such as, replication engine 324, may be arranged to employ the snapshot or epoch information of the file system objects in a file system to determine which file system objects should be copied to one or more target file systems.

In one or more of the various embodiments, file system engines, such as, file system engine 322 may be arranged to update parent object meta-data (e.g., current update epoch or snapshot number) before a write operation is committed or otherwise consider stable. For example, if file object 820 is updated, the file system engine may be arranged to examine the epoch/snapshot information for directory 810, directory 806, and directory 804 before committing the update to file object 820. Accordingly, in this example, if file object 820 is updated, directory 810, directory 806 and directory 808 may be associated the current epoch (5) before the write to file object 820 is committed (which will also associate file object 820 with epoch 5) since the update is occurring during the current epoch (epoch 5).

Note, in this example, file system 800 represent a logical layout/representation of the file system object in the file system. In some embodiments, actual file system objects may comprise one or more data blocks that may be distributed across or among storage volumes of the storage nodes that comprise. The particular distribution of blocks may be determined based various considerations that will be familiar to one of ordinary skill in the art, such as, data protection, concurrency/performance concerns, or the like. Likewise, one of ordinary skill in the art will appreciate that file systems may include various additional components, such as, cache subsystems, and so on, details of which are omitted from this disclosure for brevity and clarity.

Figure 9:
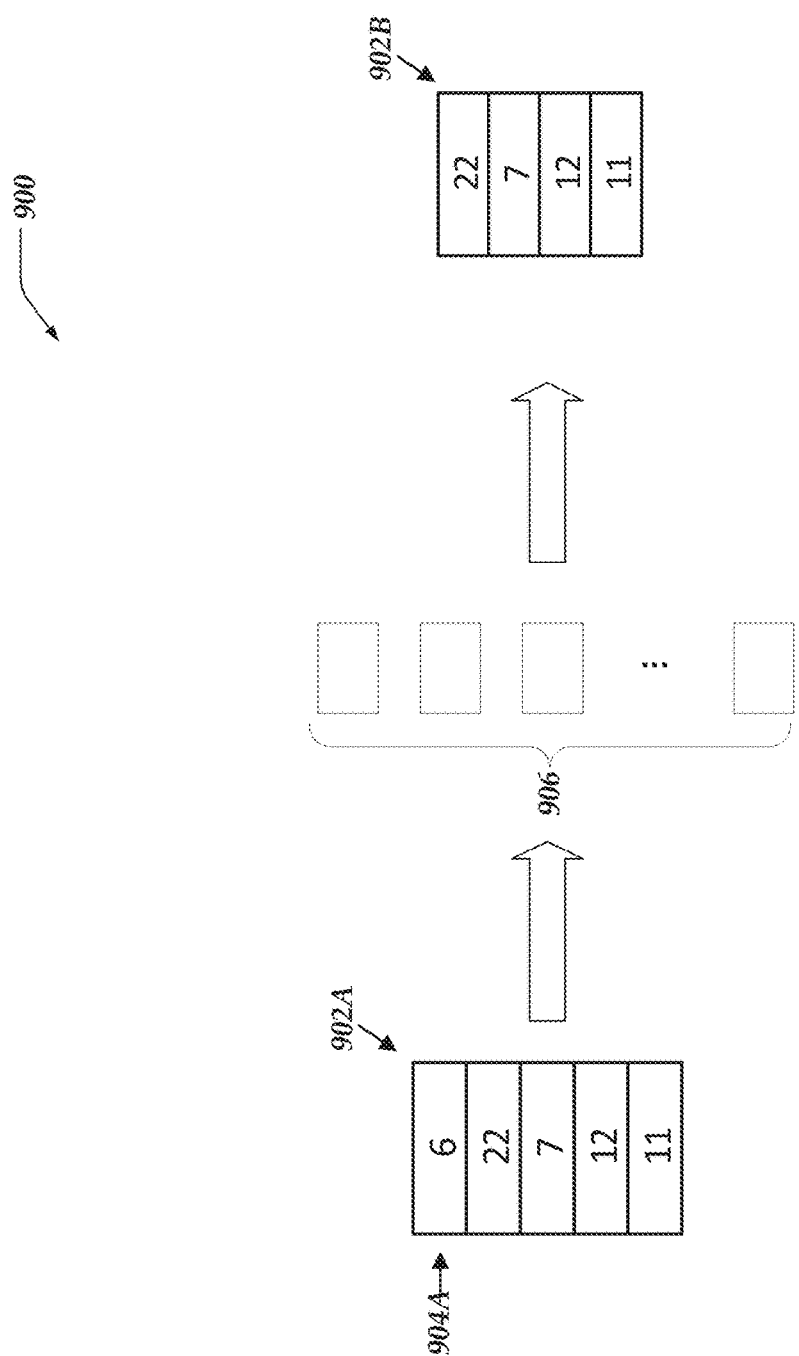
FIG. 9 illustrates a logical schematic of a system for workload allocation for file system maintenance in accordance with one or more of the various embodiments.

FIG. 9 illustrates a logical schematic of system 900 for workload allocation for file system maintenance in accordance with one or more of the various embodiments. As described above, maintenance engines may be arranged to initiate one or more delete tasks to free the storage space associated with dead blocks. Accordingly, in some embodiments, as snapshots may be designated for deletion, they may be added to one or more data structures to indicate that they have been designated for deletion. In this example, for some embodiments, data structure 902A represents a list of snapshots that are designated for deletion (e.g., deleted snapshots). Accordingly, in some embodiments, maintenance engines may be arranged to select deleted snapshots from data structure 902A and initiate one or more delete tasks such as, delete tasks 906, that may be executed on one or more storage nodes to free dead blocks that may be listed in dead trees of those storage nodes.

In one or more of the various embodiments, the number of tasks executed at the same time may vary depending on an urgency score provided by maintenance engines. In some embodiments, a higher urgency score may result in more tasks being initiated and a lower urgency score may result in fewer tasks being initiated. In some embodiments, in high urgency cases, multiple tasks per storage nodes may be initiated, in the lowest urgency cases, one task may be initiated.

In some embodiments, if the storage space for the dead blocks of a deleted snapshot is returned to the file system, the corresponding deleted snapshot may be removed from the deleted snapshot list. In some embodiments, if each storage nodes reports that it has freed the dead blocks associated with the deleted snapshot, maintenance engines may determine that all the storage space associated with the deleted snapshot has been returned to the file system. For example, in some embodiments, maintenance engines may be arranged to monitor if one or more storage nodes have reported if it has freed the dead blocks of a deleted snapshot. Accordingly, in some embodiments, the deleted snapshot may remain in the deleted snapshot list until all storage nodes have reported that they have freed any dead block in their dead trees that may be associated with the deleted snapshot. In this example, data structure 902B shows that snapshot #6 is removed after all storage nodes report that any dead blocks associated with snapshot #6 have been freed or deleted.

Generalized Operations

FIGS. 10-13 represent generalized operations for workload allocation for file system maintenance in accordance with one or more of the various embodiments. In one or more of the various embodiments, processes 1000, 1100, 1200, and 1300 described in conjunction with FIGS. 10-13 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-11 may perform actions for workload allocation for file system maintenance in accordance with at least one of the various embodiments or architectures such as those described in conjunction with FIGS. 4-9. Further, in one or more of the various embodiments, some or all of the actions performed by processes 1000, 1100, 1200, and 1300 may be executed in part by file system engine 322, or maintenance engine 324.

Figure 10:
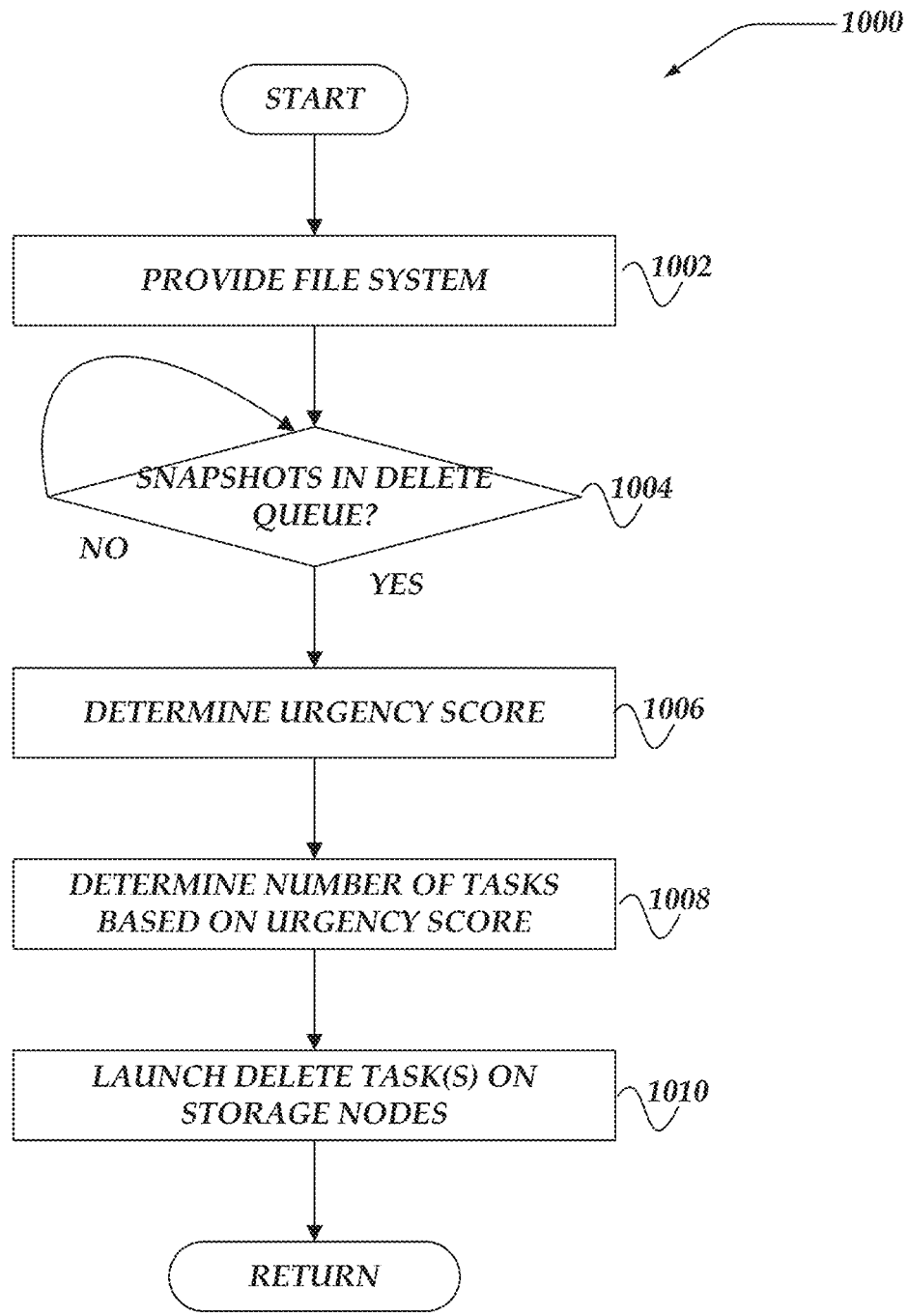
FIG. 10 illustrates an overview flowchart for a process for workload allocation for file system maintenance in accordance with one or more of the various embodiments.

FIG. 10 illustrates an overview flowchart for process 1000 for workload allocation for file system maintenance in accordance with one or more of the various embodiments. After a start block, at flowchart block 1002, in one or more of the various embodiments, as described above, a file system that includes one or more storage nodes may be provided. In some embodiments, file systems may comprise hardware network computers (on-premises), cloud computing environment computer instance and cloud storage, or combinations thereof. In some embodiments, file systems may be arranged to select or elect one or more storage nodes to act as controller nodes that may host maintenance engines, file system engines, or the like, that manage the overall operation of the file system.

At decision flowchart block 1004, in one or more of the various embodiments, if snapshots may be designated for deletion, control may flow to flowchart block 1006; otherwise, control may loop back to decision flowchart block 1004. As described above, in some embodiments, designating a snapshot for deletion may immediately be applied to a snapshot. However, the storage space associate with deleted snapshots may remain unavailable to the file system until the dead blocks associated with the deleted snapshot are freed or deleted.

At flowchart block 1006, in one or more of the various embodiments, maintenance engines may be arranged to determine a current urgency score. As described above, maintenance engines may be arranged to employ urgency scores to moderate the workload that may be required to free or delete the dead blocks associated with deleted snapshots. In some embodiments, maintenance engines may be arranged to employ workload models to determine urgency scores based on one or more metrics associated with the capacity or other characteristics of the file system.

At flowchart block 1008, in one or more of the various embodiments, maintenance engines may be arranged to determine the number of tasks based on the urgency score.

As described above, in some embodiments, maintenance engines may be arranged to initiate one or more delete tasks that may be executed on one or more storage nodes. In some embodiments, the delete tasks may be executed on storage nodes to free or delete dead blocks that may be associated with delete snapshots.

Accordingly, in some embodiments, the number of parallel/concurrent delete tasks that may be initiated may correspond to the urgency score associated with a deleted snapshot. In some embodiments, urgency scores may correspond to the specific number of allowed parallel/concurrent delete tasks. For example, in some embodiments, an urgency score of 1 may limit maintenance engines to having one delete task running at any given time for a single deleted snapshot while an urgency score of 10 may enable maintenance engines to have ten delete tasks for a single deleted snapshot running at the same time.

At flowchart block 1010, in one or more of the various embodiments, maintenance engines may be arranged to initiate the one or more tasks on one or more storage nodes in the file system. In some embodiments, maintenance engines may be arranged to provide delete task messages to storage nodes. In some embodiments, the number of storage nodes that may be executing delete tasks at the same time may be limited based on the urgency score.

Next, in one or more of the various embodiments, control may be returned to a calling process.

Figure 11:
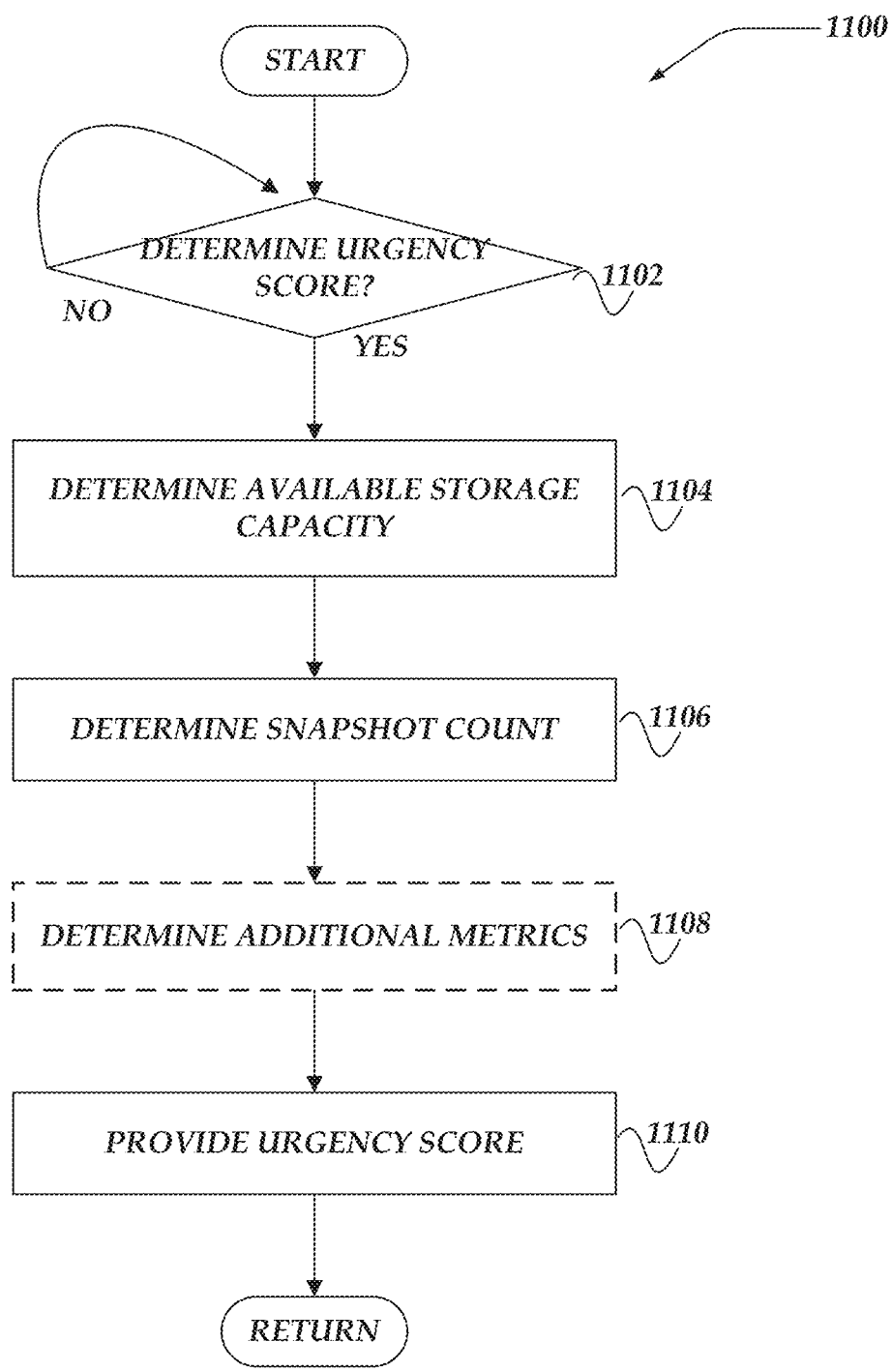
FIG. 11 illustrates a flowchart for a process for workload allocation for file system maintenance in accordance with one or more of the various embodiments.

FIG. 11 illustrates a flowchart for process 1100 for workload allocation for file system maintenance in accordance with one or more of the various embodiments. After a start block, at decision flowchart block 1102, in one or more of the various embodiments, if an urgency score may be determined, control may flow to flowchart block 1104; otherwise, control may loop back to decision flowchart block 1102. As described above, in some embodiments, snapshots may be designated for deletion by one or more of a user, an automatic process, or the like. Accordingly, in some embodiments, maintenance engines may be arranged to determine an urgency score to associated with the deleted snapshot. The urgency score may be employed to allocate the workload associated with deleting snapshots.

At flowchart block 1104, in one or more of the various embodiments, maintenance engines may be arranged to determine that current available or unused storage capacity in the file system. In one or more of the various embodiments, file systems may provide one or more accounting systems that may track one or more capacity metrics, such as, available storage space, consumed storage capacity, or the like.

In some embodiments, maintenance engines may be arranged to normalize the capacity metrics to one or more scales/ranges to enable relative/percentile capacity metrics to be employed. Also, in some embodiments, maintenance engines may be configured to determine absolute capacity metric values in addition to or instead of relative/percentile metrics values. Accordingly, in some embodiments, maintenance engines may be arranged to employ configuration information to determine the particular capacity metrics, capacity metric formats, normalization ranges, or the like, to account for local requirements or local circumstances.

At flowchart block 1106, in one or more of the various embodiments, maintenance engines may be arranged to determine the current snapshot count in the file system. In one or more of the various embodiments, the number of snapshots supported by a file system may be fixed to a defined limit. In some embodiments, the limit may be inherent in the design of the file system or the limit may be determined based on configuration information. For example, in some embodiments, snapshot limit values may be configured to be higher for file systems that may be expected to take many snapshots as compared to file system that are expected to use fewer snapshots.

At flowchart block 1108, in one or more of the various embodiments, optionally, maintenance engines may be arranged to collect one or more other metrics based on the current state of the file system. In one or more of the various embodiments, maintenance engines are not limited to determining capacity metrics or snapshot counts. In some embodiments, maintenance engines may be arranged to determine various metrics based on configured information. For example, in some embodiments, one or more metrics, such as, network utilization, cloud computing cost structures, time-of-day, rate of transactions, ongoing recovery/rebalancing operations, hardware capability/configuration, or the like, may be determined.

Note, this flowchart block is indicated as being optional because of the variability of the specific metrics that may be collected.

At flowchart block 1110, in one or more of the various embodiments, maintenance engines may be arranged to provide an urgency score based on the one or more of the snapshot count, storage availability, other metrics, or the like. In one or more of the various embodiments, maintenance engines may be provided workload models that accept one or more of the collected metrics as input values and produces an urgency score. In one or more of the various embodiments, workload models may be data structures that include instructions, rules, classifiers, or the like, that may map metrics values to urgency scores.

In some embodiments, workload models may provide individual sub-models for each metric that each provide an urgency score. Thus, in some cases, for some embodiments, the highest urgency score provided by a workload sub-model may be taken as the final overall urgency score. Also, in some embodiments, workload models may weight different metrics and combine the weighted values into a single urgency score. Further, in some embodiments, maintenance engines may be arranged to determine the current workload model based on instructions, plug-ins, extensions, libraries, or the like, provided via configuration information to account for local requirement or local circumstances.

In one or more of the various embodiments, urgency scores may correspond to the number of delete tasks that may be initiated at the same time. In some embodiments, workload models may provide the number of delete tasks that may be ran in parallel for a deleted snapshot.

Next, in one or more of the various embodiments, control may be returned to a calling process.

Figure 12:
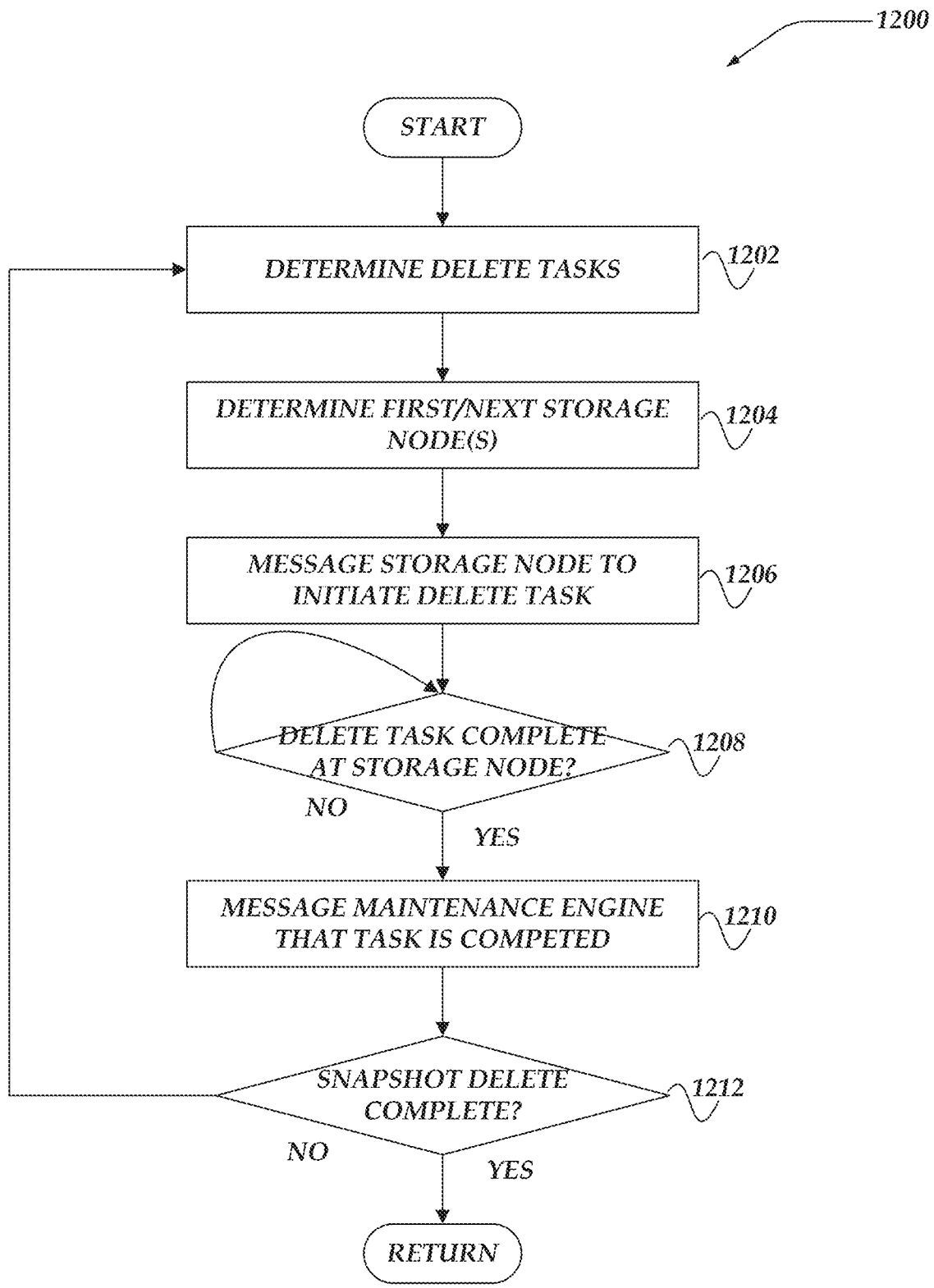
FIG. 12 illustrates a flowchart for a process for workload allocation for file system maintenance in accordance with one or more of the various embodiments.

FIG. 12 illustrates a flowchart for process 1200 for workload allocation for file system maintenance in accordance with one or more of the various embodiments. After a start block, at flowchart block 1202, in one or more of the various embodiments, maintenance engines may be arranged to determine one or more delete tasks. As described above, in some embodiments, maintenance engines may be arranged to determine an urgency score that may correspond to a number of delete tasks that may be running at same time. In some embodiments, low urgency scores may result in maintenance engines initiating fewer delete tasks than higher urgency scores. In some embodiments, the lowest urgency scores may result in one delete task running. In some embodiments, the highest urgency score may result in one or more delete tasks executing per storage node.

At flowchart block 1204, in one or more of the various embodiments, maintenance engines may be arranged to determine the first or next storage node(s). In one or more of the various embodiments, maintenance engines may be arranged to sequentially select storage nodes for executing the delete tasks. In some embodiments, if more than one delete task may be executed in parallel/concurrently, maintenance engines may determine more than one storage node. Similarly, in some embodiments, if a single delete task is allowed, each storage node in the file system cluster may be determined in sequence. Note, in some embodiments, the sequence that storage nodes may be selected may be determined randomly or based on one or more rules or instructions. Thus, in some embodiments, the particular selection order of storage nodes may be determined via configuration information to account for local requirements or local circumstances.

At flowchart block 1206, in one or more of the various embodiments, maintenance engines may be arranged to communicate messages to the one or more storage nodes to initiate delete tasks. In some embodiments, the message provided to storage nodes may include information, such as a snapshot number or other reference value, that enables the storage nodes to determine the deleted snapshot.

In one or more of the various embodiments, maintenance engines may be arranged to employ one or more data structures to track or monitor the delete tasks that have been initiated. For example, in some embodiments, maintenance engines may be arranged to maintain one or more tables that associate storage nodes, delete tasks, and delete task status values. Further, in some embodiments, these data structures or other data structures may be employed to track/monitor if delete tasks have been issued to a given storage node. Thus, in some embodiments, if the number of allowed delete tasks is less than the number of storage nodes in the file system cluster, the maintenance engines may be enabled to determine which storage nodes to send subsequent delete task messages.

At decision flowchart block 1208, in one or more of the various embodiments, if a delete task may be completed at a storage node, control may flow to flowchart block 1210; otherwise, control may loop back to decision flowchart block 1208.

At flowchart block 1210, in one or more of the various embodiments, maintenance engines may be provided messages from the storage node that delete tasks have been completed.

In one or more of the various embodiments, maintenance engines may be arranged to be notified by individual storage nodes as delete tasks may be finished. Thus, in some embodiments, if the first storage nodes complete their delete tasks, they may message the maintenance engine to indicate that the delete task was completed on those storage nodes.

Accordingly, in some embodiments, if maintenance engines initiate delete tasks, the maintenance engines may enter a quiescent state or perform other operations rather than explicitly waiting on delete tasks to complete.

At decision flowchart block 1212, in one or more of the various embodiments, if the snapshot designated for deletion has been deleted, control may be returned to a calling process; otherwise, control may loop back to flowchart block 1202.

In one or more of the various embodiments, if all the storage nodes successfully complete a delete task, the maintenance engines may determine that the storage space associated with the deleted snapshot has been returned to the file system.

Next, in one or more of the various embodiments, control may be returned to a calling process.

Figure 13:
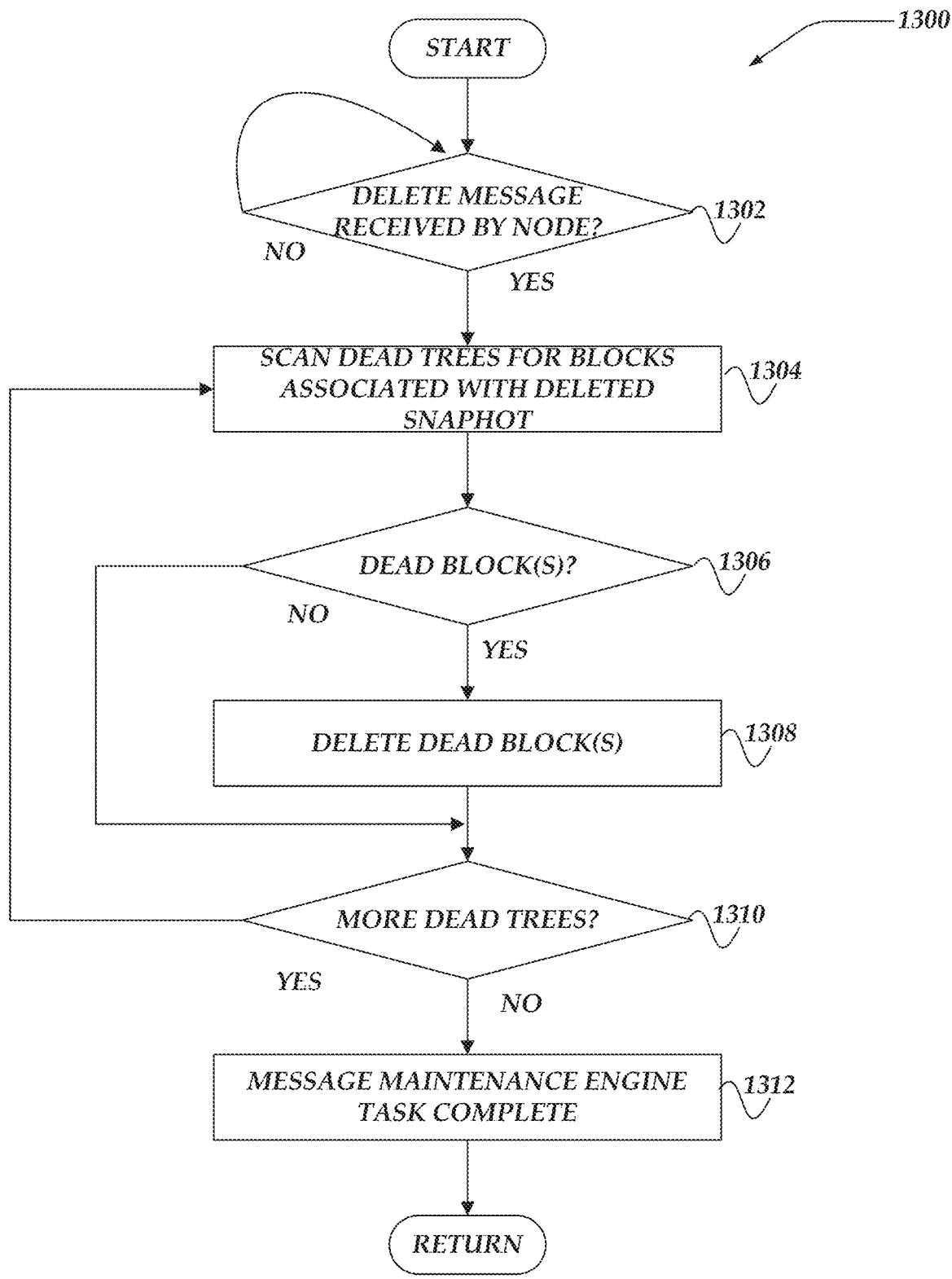
FIG. 13 illustrates a flowchart for a process for workload allocation for file system maintenance in accordance with one or more of the various embodiments.

FIG. 13 illustrates a flowchart for process 1300 for workload allocation for file system maintenance in accordance with one or more of the various embodiments. After a start block, at decision flowchart block 1302, in one or more of the various embodiments, if an initiated delete task message may be provided to a storage node, control may flow to flowchart block 1304; otherwise, control back decision flowchart block 1302. As described above, in some embodiments, maintenance engines may provide one or more messages to storage nodes to initiate delete tasks that execute on storage nodes.

In some embodiments, maintenance engines may be arranged to communicate delete task messages to storage nodes over one or more networks. Also, in some cases, in some embodiments, maintenance engines may employ other inter-process communication to initiate delete tasks locally. For example, in some embodiments, the network computer that may be hosting maintenance engines may be a storage node that has been elected/selected to provide maintenance services for a distributed file system.

In one or more of the various embodiments, delete task messages may include information for identifying one or more snapshots being deleted.

At flowchart block 1304, in one or more of the various embodiments, storage nodes may be arranged to scan one or more dead trees for dead blocks that may be associated with the deleted snapshot. As described above, in some embodiments, storage nodes may be arranged to employ one or more dead tree data structures that the file system may employ to track dead blocks. Note, in some embodiments, one or more dead blocks in a dead tree may be located on other storage nodes in the file system.

Accordingly, in some embodiments, storage nodes may be arranged to traverse their local dead trees to identify dead blocks that may be associated the one or more deleted snapshots.

At decision flowchart block 1306, in one or more of the various embodiments, if dead blocks associated with the deleted snapshot remain in the dead trees of the storage node, control may flow to flowchart block 1308; otherwise, control may flow to decision flowchart block 1310.

At flowchart block 1308, in one or more of the various embodiments, storage nodes may be arranged to free one or more dead blocks. In some embodiments, the storage space for dead blocks associated with deleted snapshots discovered in dead trees may be located in storage volumes of other storage nodes. Accordingly, in some embodiments, storage nodes may send a message to other storage nodes to free the storage space associated with dead blocks. In some cases, one or more dead blocks may be stored on the same storage node as the dead tree.

In one or more of the various embodiments, storage nodes may be arranged to employ the 'normal' capabilities of the file system to request that a dead block is freed or deleted. For example, in some embodiments, the command to delete or free dead block storage may be the same or similar to commands used to delete other file system objects rather than requiring separate or exclusive operations.

In one or more of the various embodiments, deleting dead blocks may return the storage space allocated to the dead blocks back to the file system.

At decision flowchart block 1310, in one or more of the various embodiments, if there may be more dead trees to check, control may loop back flowchart block 1304; otherwise, control may flow to flowchart block 1312. As described above, in some embodiments, storage nodes may be arranged to have one or more dead trees. Accordingly, in some embodiments, each dead tree on the storage node may be traversed to identify dead blocks that may be associated with the delete snapshot referenced in the delete task message.

At flowchart block 1312, in one or more of the various embodiments, storage nodes may be arranged to communicate messages to the maintenance engines that the delete task may be complete. In some embodiments, if all the dead blocks referenced by dead trees on the storage node have been deleted, the storage nodes may communicate this result back to the maintenance engine. In some cases, for some embodiments, the dead trees on a storage node may not reference any dead blocks associated with the deleted task referenced in the delete task message. However, in such cases, the storage nodes may similarly respond with a message that indicates success.

Further, in some embodiments, response messages may be configured to include additional information, such as, a count of dead blocks found/deleted, one or more resource utilization metrics, or the like.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions that are configured to cause performance of actions, comprising:
providing the file system that includes one or more storage nodes and a plurality of snapshots, wherein each snapshot is associated with a plurality of data blocks; and
in response to deleting one or more snapshots of the plurality of snapshots, performing further actions, including:
determining a plurality of dead blocks associated with the one or more deleted snapshots, wherein each dead block is a data block that is unassociated with one or more undeleted snapshots;
adding the plurality of dead blocks to a plurality of dead trees located on a randomly determined selection of the one or more storage nodes;
determining an urgency score based on a workload model that includes one or more individual workload sub-models for each of one or more file system metrics and one or more other metrics, wherein an overall urgency score is determined based on a highest urgency score determined by an individual workload sub-model for a plurality of delete tasks, and wherein the one or more other metrics are based on configuration information for a current state of the file system and include one or more of a network utilization, a cloud computing cost structure, a hardware capability, an ongoing rebalancing operation, or a rate of transactions;
determining initiation of the plurality of delete tasks for the one or more storage nodes based on the overall urgency score;
determining a portion of the storage nodes sequentially based on a total number of delete tasks that are initiated for each storage node in the portion, wherein a sequential order of the portion of the storage nodes is determined by an amount of the total number of initiated delete tasks that correspond to each storage node in the portion and configuration information for one or more of local requirements or local circumstances; and
executing each corresponding amount of initiated delete tasks concurrently on the portion of storage nodes to perform further actions including:
determining one or more dead blocks on the portion of storage nodes that are associated with the one or more deleted snapshots; and
deleting the one or more determined dead blocks on the portion of storage nodes and the one or more dead blocks added to the one or more dead trees on the one or more randomly determined storage nodes, wherein a storage capacity associated with the one or more deleted snapshots is returned to the file system.

2. The method of claim 1, wherein determining the one or more file system metrics, further comprises, determining one or more of a count of the plurality of snapshots or an amount of available storage capacity in the file system.

3. The method of claim 1, wherein determining the one or more dead blocks on the portion of storage nodes, further comprises:
determining one or more dead trees on the one or more storage nodes, wherein each dead tree includes a plurality of dead blocks associated with a plurality of deleted snapshots; and
traversing the one or more determined dead trees to identify the one or more dead blocks associated with the one or more deleted snapshots.

4. The method of claim 1, further comprising:
in response to a completion of the execution of each corresponding amount of initiated delete tasks, performing further actions, including:
determining a remainder portion of the one or more storage nodes, wherein the execution of the corresponding amounts of initiated delete tasks excluded the remainder portion of storage nodes; and
further executing other corresponding amounts of other initiated delete tasks on the remainder portion of storage nodes.

5. The method of claim 1, wherein deleting the one or more determined dead blocks, further comprises:
determining a portion of the one or more determined dead blocks that correspond to a storage capacity of a storage node in the file system based on the portion of the one or more determined dead blocks; and
providing a delete message to the storage node, wherein the storage node deletes the portion of the one or more determined dead blocks.

6. The method of claim 1, wherein deleting the one or more snapshots of the plurality of snapshots, further comprises:
adding the one or more deleted snapshots to a deleted snapshot queue; and
in response to deleting each dead block associated with the one or more deleted snapshots, removing the one or more deleted snapshots from the deleted snapshot queue.

7. The method of claim 1, wherein adding the plurality of dead blocks to the plurality of dead trees, further comprises:
determining one or more portions of the plurality of dead blocks;
randomly determining a storage node in the file system;
determining a dead tree stored on the randomly determined storage node; and
adding the portion of dead blocks to the determined dead tree.

8. A system for managing data in a file system comprising:
a network computer, comprising:
a memory that stores at least instructions; and
one or more processors that execute instructions that are configured to cause performance of actions, including:
providing the file system that includes one or more storage nodes and a plurality of snapshots, wherein each snapshot is associated with a plurality of data blocks; and in response to deleting one or more snapshots of the plurality of snapshots, performing further actions, including:
  determining a plurality of dead blocks associated with the one or more deleted snapshots, wherein each dead block is a data block that is unassociated with one or more undeleted snapshots;
  adding the plurality of dead blocks to a plurality of dead trees located on a randomly determined selection of the one or more storage nodes;
  determining an urgency score based on a workload model that includes one or more individual workload sub-models for each of one or more file system metrics and one or more other metrics, wherein an overall urgency score is determined based on a highest urgency score determined by an individual workload sub-model for a plurality of delete tasks, and wherein the one or more other metrics are based on configuration information for a current state of the file system and include one or more of a network utilization, a cloud computing cost structure, a hardware capability, an ongoing rebalancing operation, or a rate of transactions;
  determining initiation of the plurality of delete tasks for the one or more storage nodes based on the overall urgency score;
  determining a portion of the storage nodes sequentially based on a total number of delete tasks that are initiated for each storage node in the portion, wherein a sequential order of the portion of the storage nodes is determined by an amount of the total number of initiated delete tasks that correspond to each storage node in the portion and configuration information for one or more of local requirements or local circumstances; and
  executing each corresponding amount of initiated delete tasks concurrently on the portion of storage nodes to perform further actions including:
    determining one or more dead blocks on the portion of storage nodes that are associated with the one or more deleted snapshots;
    deleting the one or more determined dead blocks on the portion of storage nodes and the one or more dead blocks added to the one or more dead trees on the one or more randomly determined storage nodes, wherein a storage capacity associated with the one or more deleted snapshots is returned to the file system; and
a client computer, comprising:
  a memory that stores at least instructions; and
  one or more processors that execute instructions that are configured to cause performance of actions, including, providing one or more requests to delete the one or more snapshots.

9. The system of claim 8, wherein determining the one or more file system metrics, further comprises, determining one or more of a count of the plurality of snapshots or an amount of available storage capacity in the file system.

10. The system of claim 8, wherein determining the one or more dead blocks on the portion of storage nodes, further comprises:
  determining one or more dead trees on the one or more storage nodes, wherein each dead tree includes a plurality of dead blocks associated with a plurality of deleted snapshots; and
  traversing the one or more determined dead trees to identify the one or more dead blocks associated with the one or more deleted snapshots.

11. The system of claim 8, wherein the one or more network computer processors execute instructions that perform actions, further comprising:
  in response to a completion of the execution of each corresponding amount of initiated delete tasks, performing further actions, including:
    determining a remainder portion of the one or more storage nodes, wherein the execution of the corresponding amounts of initiated delete tasks excluded the remainder portion of storage nodes; and
    further executing other corresponding amounts of other initiated delete tasks on the remainder portion of storage nodes.

12. The system of claim 8, wherein deleting the one or more determined dead blocks, further comprises:
  determining a portion of the one or more determined dead blocks that correspond to a storage capacity of a storage node in the file system based on the portion of the one or more determined dead blocks; and
  providing a delete message to the storage node, wherein the storage node deletes the portion of the one or more determined dead blocks.

13. The system of claim 8, wherein deleting the one or more snapshots of the plurality of snapshots, further comprises:
  adding the one or more deleted snapshots to a deleted snapshot queue; and
  in response to deleting each dead block associated with the one or more deleted snapshots, removing the one or more deleted snapshots from the deleted snapshot queue.

14. The system of claim 8, wherein adding the plurality of dead blocks to the plurality of dead trees, further comprises:
  determining one or more portions of the plurality of dead blocks;
  randomly determining a storage node in the file system;
  determining a dead tree stored on the randomly determined storage node; and
  adding the portion of dead blocks to the determined dead tree.

15. A processor readable non-transitory storage media that includes instructions for managing data in a file system over a network, wherein execution of the instructions, by one or more processors on one or more network computers, are configured to cause performance of actions, comprising:
  providing the file system that includes one or more storage nodes and a plurality of snapshots, wherein each snapshot is associated with a plurality of data blocks; and
  in response to deleting one or more snapshots of the plurality of snapshots, performing further actions, including:
    determining a plurality of dead blocks associated with the one or more deleted snapshots, wherein each dead block is a data block that is unassociated with one or more undeleted snapshots;
    adding the plurality of dead blocks to a plurality of dead trees located on a randomly determined selection of the one or more storage nodes;

determining an urgency score based on a workload model that includes one or more individual workload sub-models for each of one or more file system metrics and one or more other metrics, wherein an overall urgency score is determined based on a highest urgency score determined by an individual workload sub-model for a plurality of delete tasks, and wherein the one or more other metrics are based on configuration information for a current state of the file system and include one or more of a network utilization, a cloud computing cost structure, a hardware capability, an ongoing rebalancing operation, or a rate of transactions;

determining initiation of the plurality of delete tasks for the one or more storage nodes based on the overall urgency score;

determining a portion of the storage nodes sequentially based on a total number of delete tasks that are initiated for each storage node in the portion, wherein a sequential order of the portion of the storage nodes is determined by an amount of the total number of initiated delete tasks that correspond to each storage node in the portion and configuration information for one or more of local requirements or local circumstances; and executing each corresponding amount of initiated delete tasks concurrently on the portion of storage nodes to perform further actions including:
 determining one or more dead blocks on the portion of storage nodes that are associated with the one or more deleted snapshots; and
 deleting the one or more determined dead blocks on the portion of storage nodes and the one or more dead blocks added to the one or more dead trees on the one or more randomly determined storage nodes, wherein a storage capacity associated with the one or more deleted snapshots is returned to the file system.

16. The media of claim 15, wherein determining the one or more file system metrics, further comprises, determining one or more of a count of the plurality of snapshots or an amount of available storage capacity in the file system.

17. The media of claim 15, wherein determining the one or more dead blocks on the portion of storage nodes, further comprises:
 determining one or more dead trees on the one or more storage nodes, wherein each dead tree includes a plurality of dead blocks associated with a plurality of deleted snapshots; and
 traversing the one or more determined dead trees to identify the one or more dead blocks associated with the one or more deleted snapshots.

18. The media of claim 15, further comprising:
 in response to a completion of the execution of each corresponding amount of initiated delete tasks, performing further actions, including:
  determining a remainder portion of the one or more storage nodes, wherein the execution of the corresponding amounts of initiated delete tasks excluded the remainder portion of storage nodes; and
  further executing other corresponding amounts of other initiated delete tasks on the remainder portion of storage nodes.

19. The media of claim 15, wherein deleting the one or more determined dead blocks, further comprises:
 determining a portion of the one or more determined dead blocks that correspond to a storage capacity of a storage node in the file system based on the portion of the one or more determined dead blocks; and
 providing a delete message to the storage node, wherein the storage node deletes the portion of the one or more determined dead blocks.

20. The media of claim 15, wherein deleting the one or more snapshots of the plurality of snapshots, further comprises:
 adding the one or more deleted snapshots to a deleted snapshot queue; and
 in response to deleting each dead block associated with the one or more deleted snapshots, removing the one or more deleted snapshots from the deleted snapshot queue.

21. The media of claim 15, wherein adding the plurality of dead blocks to the plurality of dead trees, further comprises:
 determining one or more portions of the plurality of dead blocks;
 randomly determining a storage node in the file system;
 determining a dead tree stored on the randomly determined storage node; and
 adding the portion of dead blocks to the determined dead tree.

22. A network computer for managing data in a file system, comprising:
 a memory that stores at least instructions; and
 one or more processors that execute instructions that are configured to cause performance of actions, including:
  providing the file system that includes one or more storage nodes and a plurality of snapshots, wherein each snapshot is associated with a plurality of data blocks; and
  in response to deleting one or more snapshots of the plurality of snapshots, performing further actions, including:
   determining a plurality of dead blocks associated with the one or more deleted snapshots, wherein each dead block is a data block that is unassociated with one or more undeleted snapshots;
   adding the plurality of dead blocks to a plurality of dead trees located on a randomly determined selection of the one or more storage nodes;
   determining an urgency score based on a workload model that includes one or more individual workload sub-models for each of one or more file system metrics and one or more other metrics, wherein an overall urgency score is determined based on a highest urgency score determined by an individual workload sub-model for a plurality of delete tasks, and wherein the one or more other metrics are based on configuration information for a current state of the file system and include one or more of a network utilization, a cloud computing cost structure, a hardware capability, an ongoing rebalancing operation, or a rate of transactions;
   determining initiation of the plurality of delete tasks for the one or more storage nodes based on the overall urgency score;
   determining a portion of the storage nodes sequentially based on a total number of delete tasks that are initiated for each storage node in the portion, wherein a sequential order of the portion of the storage nodes is determined by an amount of the total number of initiated delete tasks that correspond to each storage node in the portion and configuration information for one or more of local requirements or local circumstances; and executing each corresponding amount of initiated delete tasks concurrently on the portion of storage nodes to perform further actions including:
  determining one or more dead blocks on the portion of storage nodes that are associated with the one or more deleted snapshots; and
  deleting the one or more determined dead blocks on the portion of storage nodes and the one or more dead blocks added to the one or more dead trees on the one or more randomly determined storage nodes, wherein a storage capacity associated with the one or more deleted snapshots is returned to the file system.

23. The network computer of claim 22, wherein determining the one or more file system metrics, further comprises, determining one or more of a count of the plurality of snapshots or an amount of available storage capacity in the file system.

24. The network computer of claim 22, wherein determining the one or more dead blocks on the portion of storage nodes, further comprises:
  determining one or more dead trees on the one or more storage nodes, wherein each dead tree includes a plurality of dead blocks associated with a plurality of deleted snapshots; and
  traversing the one or more determined dead trees to identify the one or more dead blocks associated with the one or more deleted snapshots.

25. The network computer of claim 22, wherein the one or more processors execute instructions that perform actions, further comprising:
  in response to a completion of the execution of each corresponding amount of initiated delete tasks, performing further actions, including:
    determining a remainder portion of the one or more storage nodes, wherein the execution of the corresponding amounts of initiated delete tasks excluded the remainder portion of storage nodes; and
    further executing other corresponding amounts of other initiated delete tasks on the remainder portion of storage nodes.

26. The network computer of claim 22, wherein deleting the one or more determined dead blocks, further comprises:
  determining a portion of the one or more determined dead blocks that correspond to a storage capacity of a storage node in the file system based on the portion of the one or more determined dead blocks; and
  providing a delete message to the storage node, wherein the storage node deletes the portion of the one or more determined dead blocks.

27. The network computer of claim 22, wherein deleting the one or more snapshots of the plurality of snapshots, further comprises:
  adding the one or more deleted snapshots to a deleted snapshot queue; and
  in response to deleting each dead block associated with the one or more deleted snapshots, removing the one or more deleted snapshots from the deleted snapshot queue.

28. The network computer of claim 22, wherein adding the plurality of dead blocks to the plurality of dead trees, further comprises:
  determining one or more portions of the plurality of dead blocks;
  randomly determining a storage node in the file system;
  determining a dead tree stored on the randomly determined storage node; and
  adding the portion of dead blocks to the determined dead tree.

* * * * *